United States Patent
Amin

(10) Patent No.: US 12,073,230 B2
(45) Date of Patent: *Aug. 27, 2024

(54) SCALABLE LIFE-CYCLE MAINTENANCE OF HARDWARE

(71) Applicant: RENEO, INC., Mountain View, CA (US)

(72) Inventor: Minesh B. Amin, Mountain View, CA (US)

(73) Assignee: RENEO, INC., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/138,580

(22) Filed: Apr. 24, 2023

(65) Prior Publication Data

US 2023/0259367 A1 Aug. 17, 2023

Related U.S. Application Data

(63) Continuation of application No. 16/970,232, filed as application No. PCT/US2019/018118 on Feb. 14, 2019, now Pat. No. 11,635,971.

(Continued)

(51) Int. Cl.
*G06F 9/44* (2018.01)
*G06F 8/65* (2018.01)
*G06F 9/4401* (2018.01)

(52) U.S. Cl.
CPC .............. *G06F 9/4416* (2013.01); *G06F 8/65* (2013.01); *G06F 9/4406* (2013.01)

(58) Field of Classification Search
CPC ......... G06F 9/4416; G06F 8/65; G06F 9/4406
See application file for complete search history.

(56) References Cited

U.S. PATENT DOCUMENTS

| 7,363,480 B1 | 4/2008 | Righi et al. |
| 7,802,084 B2 | 9/2010 | Fitzgerald et al. |

(Continued)

FOREIGN PATENT DOCUMENTS

| CN | 103744695 B | 4/2014 |
| CN | 104639378 A | 5/2015 |
| CN | 105959134 A | 9/2016 |

OTHER PUBLICATIONS

Invitation to Pay Additional Fees, and, Where Applicable, Protest Fee, dated Apr. 9, 2019 or related International Application No. PCT/US2019/018118, in 2 pages.

(Continued)

*Primary Examiner* — Zahid Choudhury
(74) *Attorney, Agent, or Firm* — Procopio, Cory, Hargreaves & Savitch LLP

(57) ABSTRACT

Scalable life-cycle maintenance of hardware. In an embodiment, a software-defined Preboot eXecution Environment (PXE) server is executed to receive a request, comprising an identifier, from hardware. The identifier is compared to a plurality of attribute sets. When the identifier does not match any of the attribute sets, a task graph is generated for a PXE process for the hardware, and an initial stage of the task graph is initiated. Otherwise, when the identifier matches one of the attribute sets, the task graph associated with that attribute set is retrieved, and the a next stage in the task graph is initiated. In addition, a display key may be used to tether hardware with a user system. Furthermore, hardware may be validated by comparing signatures using a validating operating system, and a boot order of operating systems in the hardware may be changed once the hardware device is validated.

20 Claims, 11 Drawing Sheets

Related U.S. Application Data

(60) Provisional application No. 62/710,459, filed on Feb. 16, 2018.

(56) References Cited

U.S. PATENT DOCUMENTS

| | | |
|---|---|---|
| 9,183,092 B1 * | 11/2015 | Marr .................. G06F 11/1417 |
| 9,191,460 B2 | 11/2015 | Ridgill et al. |
| 2004/0268292 A1 | 12/2004 | Steeb et al. |
| 2006/0031462 A1 | 2/2006 | Xing et al. |
| 2008/0155245 A1 | 6/2008 | Lipscombe et al. |
| 2012/0066288 A1 | 3/2012 | Kanwathirtha et al. |
| 2012/0317265 A1 | 12/2012 | Das et al. |
| 2014/0068585 A1 | 3/2014 | Young et al. |
| 2014/0357187 A1 | 12/2014 | Ehrensvärd |
| 2017/0243140 A1 | 8/2017 | Achin et al. |
| 2017/0270460 A1 | 9/2017 | Dow et al. |

OTHER PUBLICATIONS

International Search Report and Written Opinion dated Jun. 17, 2019 for related International Application No. PCT/US2019/018118, in 18 pages.
Office Action dated Oct. 7, 2022 in related TW Patent Application No. 108105093, in 16 pages.
Extended European Search Report for corresponding EP Application 19755132.8 dated Nov. 12, 2021 (9 pages).

* cited by examiner

FIG. 1E
Display Key 170
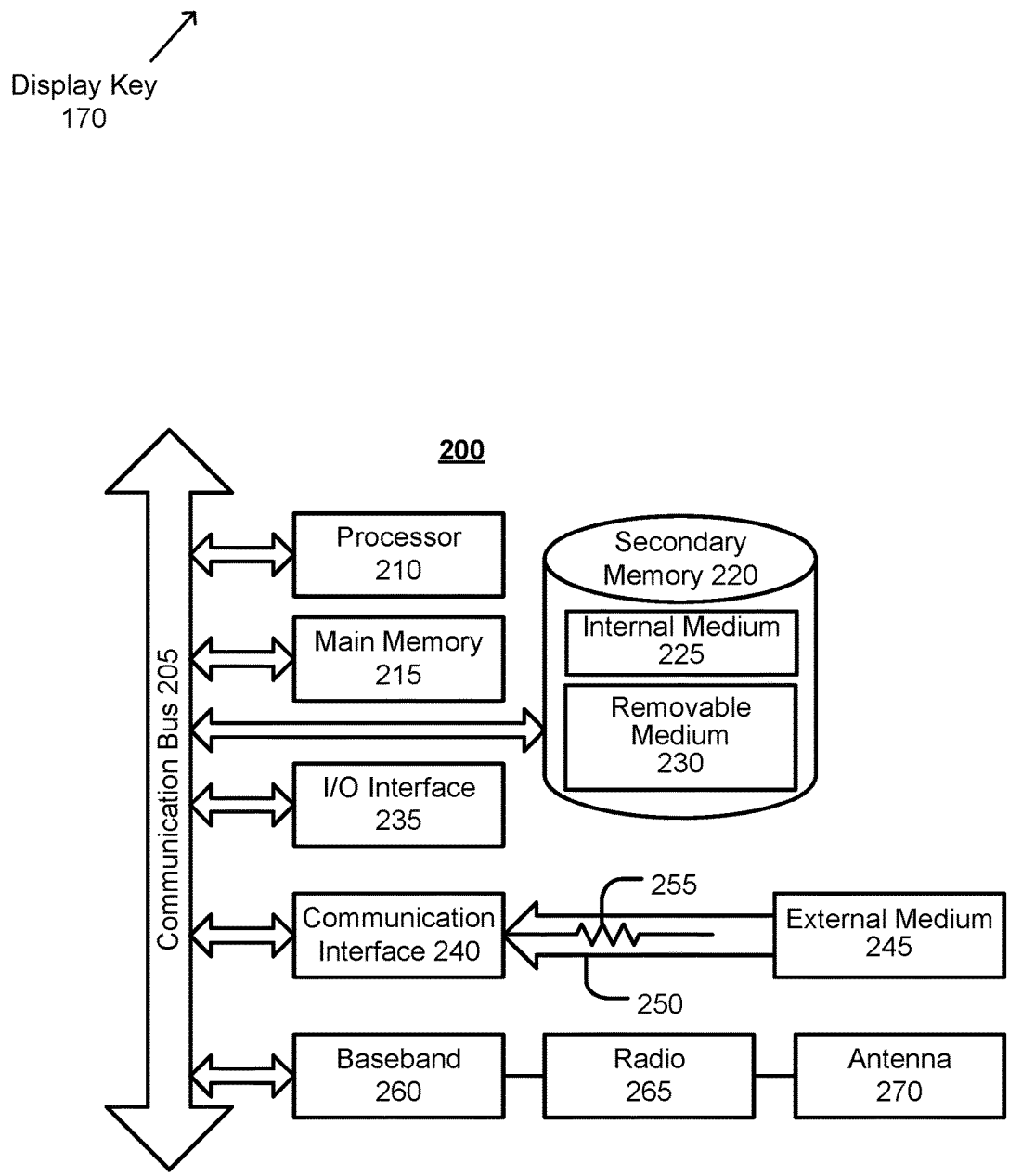
FIG. 2

400

450

500

500

SCALABLE LIFE-CYCLE MAINTENANCE OF HARDWARE

CROSS-REFERENCE TO RELATED APPLICATIONS

This application is a continuation of U.S. patent application Ser. No. 16/970,232, filed on Aug. 14, 2020, which is a national stage entry of International Patent Application No. PCT/US2019/018118, filed on Feb. 14, 2019, which claims priority to U.S. Provisional Patent App. No. 62/710,459, filed on Feb. 16, 2018, which are all hereby incorporated herein by reference as if set forth in full.

BACKGROUND

Field of the Invention

The embodiments described herein are generally directed to maintaining hardware throughout its life cycle, and, more particularly, to scalable mechanisms for updating firmware on hardware, establishing the physical locations of hardware, and/or executing maintenance tasks on hardware without the need for dedicated input/output devices, over the entire life cycle of the hardware.

Description of the Related Art

The life cycle of modern hardware may span multiple different vendors and operators. For instance, a typical life cycle may comprise the following stages: (a) pre-shipment, in which the hardware is assembled; (b) post-shipment/pre-deployment, in which the assembled hardware is received by a purchaser, but has yet to be deployed; (c) deployment, in which the received hardware is deployed into a production environment; (d) post-deployment, in which the hardware is no longer live within the production environment, and is in the process of being decommissioned; and (e) decommissioned, in which the hardware has been decommissioned and is sold to a recycler or refurbisher. In this case, the life cycle of the hardware involves at least three different entities: (a) the vendor in charge of assembly and shipment; (b) the purchaser who deploys the hardware; and (c) the recycler or refurbisher to whom the hardware is given or sold by the purchaser after being decommissioned. In addition, even after hardware has been decommissioned, the hardware's life cycle may be extended by a refurbisher who resells the hardware to another purchaser. Notably, each of the entities involved in the hardware's life cycle may possess its own unique information technology (IT) infrastructure, which makes it difficult for the different entities to collaborate over the life cycle of the hardware.

Each of the entities involved in the life cycle of the hardware must address at least three issues to varying degrees: (a) updating the firmware utilized by the hardware; (b) establishing a mapping between the Internet Protocol (IP) address(es) used by the hardware and the physical location(s) of the hardware; and (c) executing maintenance tasks on the hardware. Typically, with respect to the first issue, firmware is updated manually, except in special cases in which the infrastructure is defined or grouped in terms of only one type of hardware. In addition, with respect to the second issue, while a conventional Intelligent Platform Management Interface (IPMI) can be used to map IP addresses to physical hardware locations, IPMI subsystems are generally assigned static IP addresses which must be tracked by IT personnel using best practices and policies.

Finally, with respect to the third issue, maintenance tasks are performed in one of two ways: (a) by logging into the hardware from a remote location; or (b) by physically interacting with the hardware using dedicated input/output devices (e.g., a computer monitor, keyboard, and/or mouse).

To aid parties in the maintenance of their hardware, the Preboot eXecution Environment (PXE), introduced by Intel Corporation™, specifies a standardized client-server environment that may be used to deploy a software image (e.g., an operating system) from a server to client hardware. FIG. 1A illustrates a standard operation in a PXE 160. Initially, hardware 150 will broadcast a request for an IP address, which is processed by a Dynamic Host Configuration Protocol (DHCP) server 162. In the event that hardware 150 is PXE-enabled, the request will indicate PXE-specific options. In response, a PXE-aware DHCP server 162 will return network parameters, comprising an IP address to be used by hardware 150, the IP address of PXE server 164 (which may comprise a Trivial File Transfer Protocol (TFTP) server), and an identification of the network bootstrap program (NBP) to be used. Next, a PXE-enabled network interface card (NIC) on hardware 150 will transmit a request for the NBP to the IP address of PXE server 164. In response, PXE server 164 will provide the NBP to hardware 150, which will then execute the NBP. The NBP, executing on hardware 150, will then send a request, comprising the Media Access Control (MAC) address of the transmitting PXE-enabled NIC, to PXE server 164. In response, PXE server 164 will return a configuration file to hardware 150. Typically, this configuration file will comprise details on how to obtain necessary operating system (OS) components, such as a bootloader and kernel. The NBP on hardware 150 will download these OS components and launch the operating system. This operating system may then execute a task graph (e.g., to deploy a software image stored on PXE server 164 or another server within or outside of PXE 160, update firmware, etc.).

A problem with standard PXE implementations is that only one configuration may be associated with any given MAC address. Thus, standard PXE implementations are limited to serving either a single operating system or a menu containing multiple operating systems from which the user must manually select. Additionally, the task graph processed by the default or manually selected operating system is completely decoupled from PXE 160. Furthermore, there is currently no mechanism within a conventional PXE 160 to track multiple task graphs, which may require multiple boots. However, as explained above, the life cycle of hardware 150 may span a plurality of distinct entities. In many cases, it would be advantageous to serve configurations, which are tightly coupled with stages within a task graph (and not just a MAC address), to facilitate the separation of the PXE-related responsibilities for hardware 150 into discrete sets of tasks, and assign responsibility of these discrete sets of tasks to different entities.

An additional problem that arises in the context of hardware maintenance, within a large IT infrastructure, is how to interact with the multitude of hardware 150. For example, a data center may contain hundreds of racks of servers. As mentioned above, IT personnel traditionally must physically interact with the hardware using dedicated input/output devices. In this case, the personnel will generally roll a cart, with a computer monitor, keyboard, and mouse, from rack to rack, to maintain each rack. This is cumbersome and time consuming. While it may be faster to perform these tasks remotely, as mentioned above, this typically requires IT personnel to map static IP addresses to physical locations, which can also be cumbersome and time consuming.

Thus, there is a need for more efficient and scalable mechanisms for updating firmware of hardware, mapping IP addresses of hardware to physical locations of the hardware, and/or performing other maintenance tasks on the hardware. Ideally, these mechanisms could be applied in a consistent manner across the entire span of the hardware's life cycle, even when different entities are involved.

SUMMARY

Accordingly, systems, methods, and non-transitory computer-readable media are disclosed for efficient and scalable maintenance of hardware over the entire life cycle of the hardware.

In an embodiment, a method is disclosed that comprises, by at least one hardware processor, executing a software-defined Preboot eXecution Environment (PXE) server to: receive a request from a hardware device over at least one network, wherein the request comprises an identifier associated with the hardware device; compare the identifier to a plurality of attribute sets stored in memory; when the identifier does not match any of the plurality of attribute sets, generate a task graph for a PXE process for the hardware device, wherein the task graph comprises a plurality of stages, and wherein each of the plurality of stages comprises one or more tasks, and initiate an initial stage in the generated task graph; and, when the identifier matches one of the plurality of attribute sets, retrieve a task graph associated with the one attribute set, and initiate a next stage in the retrieved task graph. Initiating the initial stage and initiating the next stage may comprise transmitting a configuration file to the hardware device over the at least one network, wherein the configuration file comprises one or more instructions representing the one or more tasks in the respective stage. Each of the plurality of attribute sets may comprise at least one identifier from a prior request received from an associated hardware device. Each of the plurality of attribute sets may comprise two or more identifiers associated with a hardware device from which a prior request was received. Initiating the initial stage may comprise instructing the hardware device to download and boot an operating system that probes two or more components of the hardware device and transmits a result of the probe to the software-defined PXE server, and the method may further comprise, by the at least one hardware processor, executing the software-defined PXE server to: receive the result of the probe from the operating system on the hardware device; generate an attribute set from the result of the probe; and store the generated attribute set as one of the plurality of attribute sets in the memory. The two or more components of the hardware device may comprise a first network interface card and a second network interface card, and the result of the probe and the generated attribute set may comprise a first identifier of the first network interface card and a second identifier of the second network interface card. The first identifier and the second identifier may both comprise a Media Access Control (MAC) address. Comparing the identifier to a plurality of attribute sets may comprise comparing the identifier to the first identifier and the second identifier in one or more of the plurality of attribute sets until the identifier matches either the first identifier or the second identifier in one of the plurality of attribute sets or all of the plurality of attribute sets have been compared, wherein, when the identifier matches either the first identifier or the second identifier in one of the plurality of attribute sets, the identifier matches that one attribute set. The method may further comprise, by the at least one hardware processor, executing the software-defined PXE server to: receive a result of at least one stage, executed on the hardware device, from the hardware device; and store the received result of the at least one stage in association with the hardware device in the memory; wherein determining the next stage in the retrieved task graph comprises identifying the next stage in the retrieved task graph based on the received result of the at least one stage. Storing the received result of the at least one stage in association with the hardware device may comprise storing the received result of the at least one stage in association with an attribute set, within the plurality of attribute sets stored in the memory, that is associated with the hardware device. The method may further comprise, by the at least one hardware processor, transmitting the attribute set associated with hardware device and at least a portion of the result of one or more stages performed by the hardware device, over at least one external network, to an external platform. The method may further comprise, by the at least one hardware processor, executing the software-defined PXE server to, for each of a plurality of iterations, until a final stage in the task graph has been completed: receive a request from the hardware device; match the identifier in the received request to the one attribute set; retrieve the task graph associated with the one attribute set; determine the next stage in the retrieved task graph based on the received result from at least one preceding stage; and initiate the next stage in the retrieved task graph. At least one stage in the task graph may comprise updating firmware on the hardware device. At least one stage in the task graph, following the stage in which the firmware is updated, may comprise testing a performance or reliability of the hardware device. At least one stage in the task graph, preceding the stage in which the firmware is updated, may comprise testing a performance or reliability of the hardware device. The method may further comprise, by the at least one hardware processor, executing the software-defined PXE server to retrieve results of a prior PXE process, performed by a different PXE server, over at least one external network from an external platform, wherein the task graph is generated based on the retrieved results of the prior PXE process.

In an embodiment, a method is disclosed that comprises, by at least one hardware processor of a hardware device, for a plurality of iterations: transmitting a request to a Preboot eXecution Environment (PXE) server over at least one network, wherein the request comprises an identifier associated with the hardware device; receiving a configuration file from the PXE server over the at least one network, wherein the configuration file comprises one or more instructions representing one or more tasks in a stage of a multi-stage task graph; executing the configuration file; transmitting a result of the execution to the PXE server over the at least one network; and rebooting the hardware device. In at least one of the plurality of iterations, executing the configuration file may comprise downloading and booting an operating system that probes two or more components of the hardware device and transmits a result of the probe to the PXE server. The two or more components of the hardware device may comprise a first network interface card associated with a first identifier and a second network interface card associated with a second identifier. The first identifier and the second identifier may both comprise a Media Access Control (MAC) address.

In an embodiment, a method is disclosed that comprises, by at least one hardware processor of a user system: detecting a connection of a display key to the user system;

transmitting a tethering request, over at least one network, to a platform, wherein the tethering request comprises a unique user identifier; receiving a response message, over the at least one network, from the platform, wherein the response message comprises a unique display-key identifier; writing the unique display-key identifier to a persistent storage on the display key; and, after the unique display-key identifier has been successfully written, transmitting a success message, over the at least one network, to the platform. The response message may further comprise a payload, wherein the at least one hardware processor of the user system further writes the payload to the persistent storage on the display key. The payload may comprise credentials to be used to encrypt data. The credentials may comprise a public key associated with the unique user identifier. The unique display-key identifier may be written to a dedicated partition in the persistent storage on the display key. The display key may be a hot-pluggable device, wherein the connection of the display key to the user system comprises an insertion of a connector of the display key into a corresponding connector of the user system. The hot-pluggable device may be a Universal Serial Bus (USB) flash drive, wherein the connector of the display key and the connector of the hardware device are corresponding USB connectors. The method may further comprise, by at least one hardware processor of the platform: receiving the tethering request, over the at least one network, from the user system; generating the unique display-key identifier; transmitting the response message, over the at least one network, to the user system; receiving the success message, over the at least one network, from the user system; and, in response to receiving the success message, storing an association between the unique user identifier and the unique display-key identifier in a persistent storage of the platform, to thereby establish a two-way tether between the user system and the display key. The method may further comprise, by the at least one hardware processor of the user system: acquiring a code from a visual representation that has been displayed on a hardware display of a first hardware device; and transmitting a second tethering request, over the at least one network, to the platform, wherein the second tethering request comprises the unique user identifier and the code. The visual representation may comprise a barcode or a Quick Response (QR) code that encodes the code. The method may further comprise, by the at least one hardware processor of the platform: receiving the second tethering request, over the at least one network, from the user system; receiving the code and a unique identifier of the first hardware device, over the at least one network, from the first hardware device; matching the code in the second tethering request to the code received from the first hardware device; and, in response to the match, storing an association between the unique user identifier and the unique identifier of the first hardware device in the persistent storage of the platform, to thereby establish a three-way tether between the user system, the display key, and the first hardware device. The first hardware device may be a hub. The method may further comprise, by the at least one hardware processor of the platform: receiving a third tethering request, over the at least one network, from a second hardware device that is downstream from the hub within a Preboot eXecution Environment (PXE) infrastructure, wherein the third tethering request comprises a unique identifier of the second hardware device and the unique display-key identifier; and, in response to the third tethering request, storing an association between the unique identifier of the second hardware device and the unique display-key identifier, to thereby establish a four-way tether between the user system, the display key, the first hardware device, and the second hardware device. The method may further comprise, by the at least one hardware processor of the platform, after establishing the four-way tether: receiving data, over the at least one network, from the second hardware device; and, based on the four-way tether, transmitting a message, derived from the data, to the user system. The method may further comprise, by at least one hardware processor, of the second hardware device: detecting a connection of the display key to the second hardware device; after detecting the connection of the display key to the second hardware device, reading the unique display-key identifier from the persistent storage on the display key, and transmitting the third tethering request, over the at least one network, to the platform; and, for as long as the connection of the display key to the second hardware device is detected, transmitting the data, over the at least one network, to the platform. The data may comprise an Internet Protocol (IP) address assigned to the second hardware device. The data may comprise a status of the hardware device. The status may comprise a status of a Preboot eXecution Environment (PXE) task being executed by the second hardware device. The second hardware device may be a top-of-the-rack switch within a rack, and the method may further comprise, by the at least one hardware processor of the platform, after establishing the four-way tether: receiving an indication, over the at least one network, from the user system, to begin an operation of mapping physical locations of a plurality of hardware units within the rack; and, subsequently, for each of the plurality of hardware units within the rack, receiving a transmission, over the at least one network, from the hardware unit, wherein the transmission comprises a unique identifier of the hardware unit, storing an association between the unique identifier of the hardware unit and an indication of an order in which the transmission was received, relative to transmissions from other ones of the plurality of hardware units, wherein the indication of the order represents a physical location of the hardware unit within the rack, and transmitting a notification, over the at least one network, to the user system, to indicate that the transmission from the hardware unit was received. The method may further comprise, by the at least one hardware processor of the platform, for each of the plurality of hardware units within the rack, mapping an Internet Protocol (IP) address assigned to the hardware unit to the physical location of the hardware unit.

In an embodiment, a method, for a hardware device that has at least two installed operating systems that are booted according to a boot order, comprises, by at least one hardware processor of the hardware device: for an initial boot of the hardware device, booting a validating one of the at least two installed operating systems over a primary one of the at least two installed operating system; computing a signature of the hardware device; comparing the computed signature of the hardware device to a previously stored signature of the hardware device; displaying a visual code representing a result of the comparison between the computed and previously stored signatures; acquiring a validation code; and, in response to acquisition of the validation code, determining whether or not the validation code is valid, when the validation code is determined to be valid, changing the boot order to boot the primary operating system over the validating operating system, and, when the validation code is not determined to be valid, retaining the boot order to boot the validating operating system over the primary operating system. The visual code may comprise a barcode or Quick Response (QR) code. The validation code may comprise a character string, wherein acquiring the validation code comprises receiving a user input of the character string.

Any of the above methods may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 1E illustrates an example data layout of the onboard persistent storage of a display key, according to an embodiment;

FIG. 2 illustrates an example processing system, by which one or more of the processed described herein, may be executed, according to an embodiment;

DETAILED DESCRIPTION

In an embodiment, systems, methods, and non-transitory computer-readable media are disclosed for efficient and scalable maintenance of hardware over the entire life cycle of the hardware. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview 1.1. Infrastructure Overview

Figure 1A:
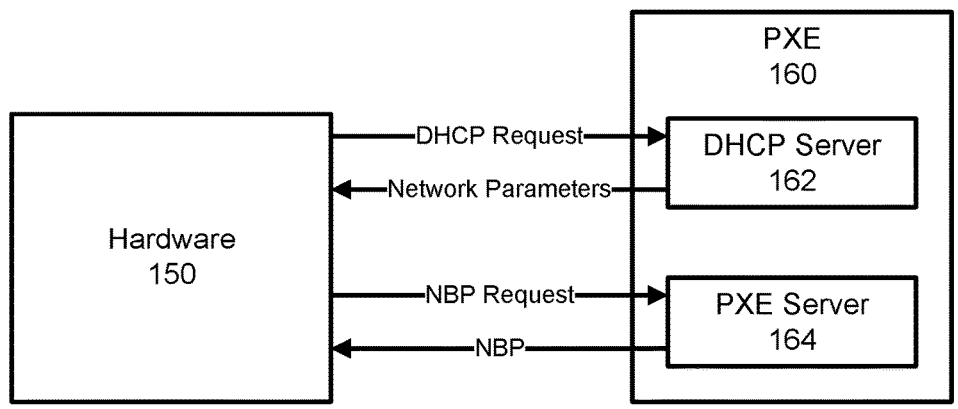
FIG. 1A illustrates a conventional PXE process.
Figure 1B:
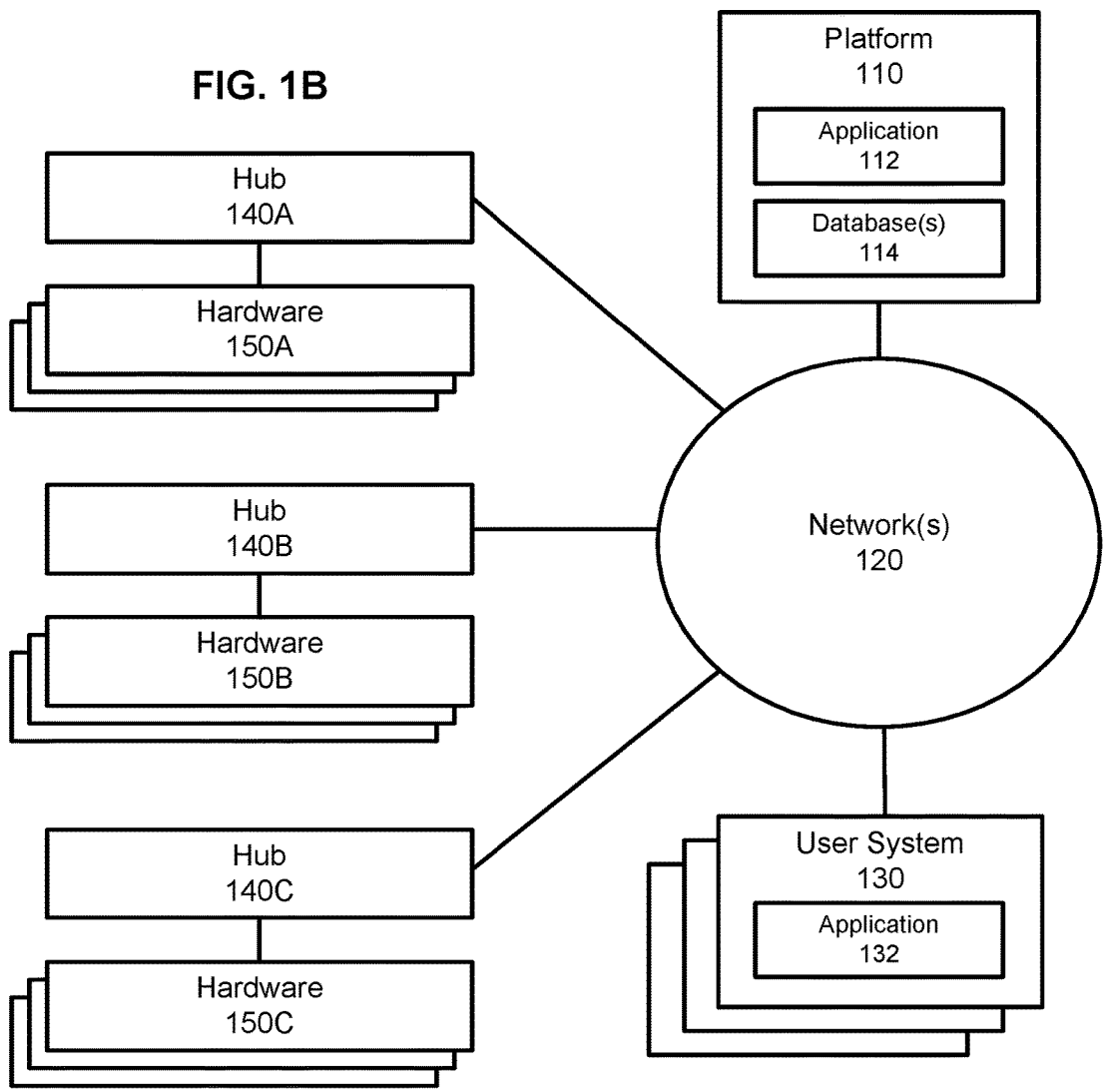
FIG. 1B illustrates an example infrastructure, in which one or more of the processes described herein, may be implemented, according to an embodiment.

FIG. 1B illustrates an example infrastructure in which one or more of the disclosed processes may be executed, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more hubs 140 via one or more networks 120.

Network(s) 120 may comprise the Internet, and platform 110 may communicate with user system(s) 130 and/or hubs 140 through the Internet using standard transmission protocols, such as HyperText Transfer Protocol (HTTP), HTTP Secure (HTTPS), File Transfer Protocol (FTP), FTP Secure (FTPS), Secure Shell (SSH), SSH FTP (SFTP), Transmission Control Protocol (TCP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or hubs 140 via the Internet, but may be connected to one or more other user systems 130 and/or hubs 140 via an intranet. Furthermore, while only a few user systems 130 and hubs 140, one server application 112, and one set of database(s) 114 are illustrated, it should be understood that the infrastructure may comprise any number of user systems, hubs, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, Automated Teller Machines, and/or the like. In an exemplary embodiment, user system(s) 130 comprise a smart phone, tablet computer, and/or other mobile device, capable of wireless communication using long-range wireless technology (e.g., via a cellular network using 3G, 4G, 5G, or other long-range technology) and/or short-range wireless technology (e.g., via Bluetooth™, or another short-range technology), and comprising at least an integrated display and camera.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. It should be understood that platform 110 may also respond to other requests from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™, Oracle™, IBM™, Microsoft SQL™, Access™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from user system(s) 130 and/or hub(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or hub(s) 140 may interact with the web service. Thus, user system(s) 130 and/or hub(s) 140 (which may themselves be servers), can define their own user interfaces, and rely on the web service to implement or otherwise provide the backend processes, methods, functionality, storage, and/or the like, described herein. For example, in such an embodiment, a client application 132 executing on one or more user system(s) 130 may interact with server application 112 executing on platform 110 to execute one or more or a portion of one or more of the various functions, processes, methods, and/or software modules described herein. Client application 132 may be "thin," in which case processing is primarily carried out server-side by server application 112 on platform 110. A basic example of a thin client application is a browser application, which simply requests, receives, and renders webpages at user system(s) 130, while the server application on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the application described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules that implement one or more of the functions, processes, or methods of the application described herein.

1.2. Hardware Overview

Figure 1C:
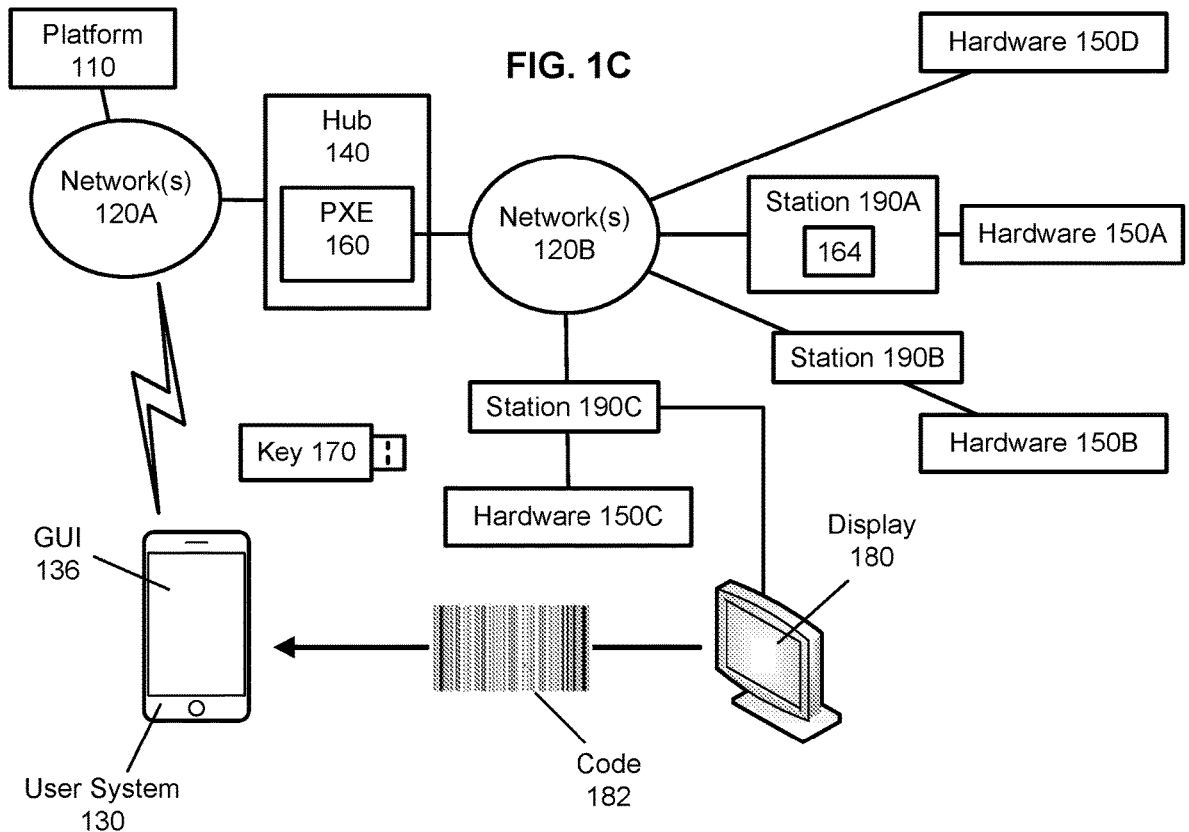
FIG. 1C illustrates a portion of the infrastructure in FIG. 1B in greater detail, according to an embodiment.

FIG. 1C illustrates a portion of the infrastructure in FIG. 1B in greater detail, according to an embodiment. As illustrated, hub 140 may comprise PXE 160, which may include PXE server 164 (e.g., a software-defined PXE server). Hub 140 may be communicatively connected to platform 110 via network(s) 120A. In addition, PXE 160 of hub 140 may be communicatively connected, either directly or indirectly, to one or more hardware 150 via network(s) 120B. It should be understood that hardware 150 may be any type of network device requiring maintenance (e.g., firmware updates), including, without limitation, servers, appliances, personal computers, Internet of Things (IoT) devices, and/or the like. In addition, hardware 150 may be homogenous (e.g., hardware 150A may be the same type of device as hardware 150B-150D) or heterogeneous (e.g., hardware 150A may be a different type of device than one or more of hardware 150B-150D).

As illustrated, one or more hardware 150 may be indirectly connected to hub 140 via a station 190. Station 190 may be a server, top-of-the-rack switch, and/or the like. As one example, station 190A may be a server with at least two network interface cards (NICs). A first NIC enables station 190A to boot using PXE 160 in hub 140, while a second NIC enables station 190A to host its own software-defined PXE server 164. Thus, station 190A may be used to process PXE boot requests from any hardware 150A connected to a network (not shown) to which the second NIC of station 190A is connected. Alternatively, a station (e.g., station 190B or 190C) may relay PXE requests and responses between hub 140 (e.g., on a first NIC) and hardware 150 (e.g., on a second NIC), without hosting its own PXE server 164. In addition, some stations, such as station 190B, may not have a display port, whereas other stations, such as station 190C, may have a display port. As discussed elsewhere herein, stations 190 and/or hardware 150 with display ports may be handled differently (e.g., in the context of N-way tethering) than stations 190 and/or hardware 150 without display ports.

Hardware 150 and station 190 communicate, via network(s) 120B, with PXE 160, which hosts, for example, a software-defined PXE service. In this manner, PXE 160 is capable of servicing PXE requests from hardware 150 and/or station 190. At least some hardware 150A may communicate, via one or more networks, with PXE server 164 on station 190A. In this case, a software-defined PXE service, hosted on station 190A, services the PXE requests from hardware 150A. Thus, PXE requests from hardware 150 may be serviced by either a hub 140 or a station 190, depending on the design and operating conditions of the local infrastructure for a given entity.

As illustrated, a station 190C with a display port may be connected to a display 180, which is capable of displaying a code 182 (e.g., a barcode, Quick Response (QR) code, alphanumerical or numerical character string, etc.). A mobile user system 130 (e.g., smart phone) may comprise a camera capable of capturing an image of code 182 on display 180 via a graphical user interface (GUI) 136 (e.g., provided by client application 132 and/or server application 112). User system 130 is configured to wirelessly communicate (e.g., via a cellular network, Wi-Fi™ network, etc.) with platform 110 via network(s) 120A. In an embodiment, user system 130 and one or more of hub 140, station 190, and hardware 150 may also be configured to communicate directly (e.g., via wireless or wired connection).

In an embodiment, display key 170 is a flash drive with a Universal Serial Bus (USB) connector. However, display key 170 may be any type of hot-pluggable device with onboard persistent storage (e.g., a solid state drive (SSD)) and the ability to interface with hardware 150. In any case, display key 170 is preferably a lightweight, ultra-portable device that uses a ubiquitous communication standard, such as USB, so that it is compatible with any or all types of hardware 150. Display key 170 may be a hot-pluggable device that can be configured to be uniquely identifiable across a plurality of available display keys 170 (e.g., to be used by different user systems 130, potentially operated by different users).

Display key 170 is configured to be communicatively connected to hub 140, hardware 150, and/or station 190 (e.g., via insertion of a USB male connector on display key 170 into a corresponding USB female connector within the respective device), which are, in turn, communicatively connected to platform 110, which is, in turn, communicatively connected to user system 130. Thus, N-way tethering can be established between user system 130, display key 170, and hub 140, hardware 150, and station 190, such that user system 130 may access data on the hub 140, hardware 150, or station 190 to which display key 170 is connected, via network(s) 120 to which platform 110 and/or hub 140 have access. For instance, after an N-way tether has been established with a particular device (e.g., hub 140, hardware 150, or station 190), whenever display key 170 is inserted into that particular device, platform 110 may relay data (e.g., in real time or near real time), received from that particular device, to user system 130 via network(s) 120. User system 130 may utilize the data, relayed from that particular device, via platform 110, to display information about that particular device on GUI 136. As an example, the data and displayed information may indicate the status, parameters, metrics, attributes, and/or the like of the particular device to which display key 170 is connected.

Advantageously, the use of N-way tethering, between user system 130, display key 170, and devices within an entity's internal network, provides the ability to interface with these devices without exposing the credentials and authentication setup of entities involved in the life cycle of hardware 150. Specifically, the user does not need to interact with the authentication mechanism of a particular hub 140, hardware 150, station 190, PXE 160, or local IT infrastructure. Rather, the user simply interacts with platform 110, which may have a uniform authentication mechanism (e.g., a user-specific username and password), in order to interact with the device via the N-way tether. In an embodiment in which user system 130 may interact directly with a device in the PXE infrastructure (e.g., hub 140, hardware 150, and/or station 190), user system 130 may directly access data stored on the device using a uniform authentication mechanism provided by client application 132 (e.g., which is able to decrypt encrypted data stored in local persistent storage of the device).

In an embodiment, each of hub 140, hardware 150, and/or station 190 may execute one or more onboard agents to perform one or more of the functions of these devices described herein. For example, the onboard agent may automatically detect the connection (e.g., insertion) of display key 170, and, in the circumstances described herein, responsively begin communication with platform 110. In addition, the same or different onboard agent may automatically collect data (e.g., an attribute set as described elsewhere herein) and report the collected data to an onboard agent of an upstream device (e.g., from hardware 150 to station 190, hub 140, or platform 110, from station 190 to hub 140 or platform 110, or from hub 140 to platform 110). It should be understood that the onboard agent(s) are preferably implemented in software. However, the onboard agent(s) could alternatively be implemented in hardware. While a single onboard agent may be described herein for the sake of simplicity, it should be understood that the onboard agent may be implemented as one or a plurality of onboard agents.

In an embodiment, each component of a PXE infrastructure is associated with a universal unique identifier (UUID) that uniquely identifies the component relative to all other components in the PXE infrastructure and, in an embodiment, across the PXE infrastructures of different entities. For example, platform 110, hub 140, station 190, user system 130, display key 170, and hardware 150 may all be associated with individual UUID's. However, although the $UUID_{US}$ will be described herein as a UUID of user system 130, it should be understood that the $UUID_{US}$ may be a UUID of a user account (e.g., registered with platform 110 and signed into via a client application 132 on user system 130), rather than being tied to a particular user system 130 itself.

Figure 1D:
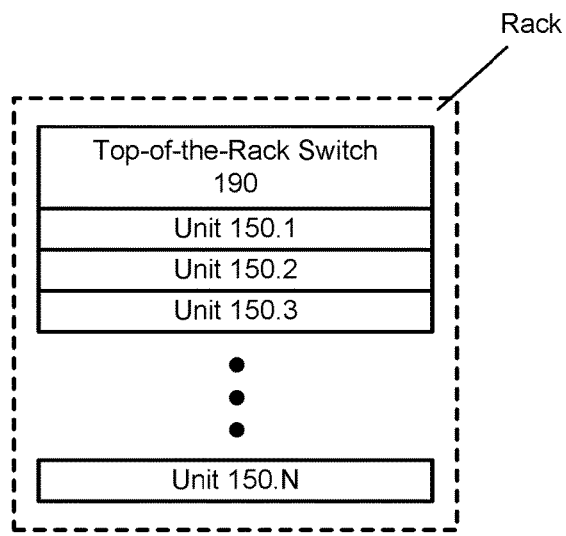
FIG. 1D illustrates an example of a rack in greater detail, according to an embodiment.

FIG. 1D illustrates an example of a rack, according to an embodiment. In the illustrated example, station 190 is a top-of-the-rack switch in a rack with a plurality of hardware units 150.1-150.N (e.g., servers). Hardware units 150.1-150.N are connected (e.g., via cabling) to top-of-the-rack switch 190. A typical data center may comprise a plurality of such racks.

1.3. Example Display Key

FIG. 1E illustrates an example data layout of the onboard persistent storage of display key 170, according to an embodiment. As mentioned above, display key 170 may be an ordinary USB flash drive with an SSD as onboard persistent storage.

In an embodiment, in order to facilitate N-way tethering, the onboard persistent storage is formatted, according to a unique file-system type, to create a special partition 174 that is registered in boot sector 172. Unlike ordinary file-system types (e.g., Virtual File Allocation Table (VFAT), Fourth Extended Filesystem (Ext4), etc.), partition 174 is designed to be easily identifiable by the host operating system. The size of partition 174 may be fixed to a predefined value, and the file-system type may be assigned a value that is unlikely to clash with other common file-system types.

In an embodiment, partition 174 is populated with a $UUID_{DK}$ of display key 170 and an initial payload value to indicate the absence of any N-way tethering. This initial payload value may be a null value (e.g., all 0's) or any other predefined value that can be easily recognized as an indication that display key 170 is not engaged in N-way tethering. When display key 170 is engaged in N-way tethering, the initial payload value in partition 174 will be overwritten (e.g., by user system 130 or hardware 150) with a different payload value that indicates the presence of N-way tethering. In the event that display key 170 is prematurely unmounted prior to the establishment of N-way tethering, the payload value in partition 174 should reflect the absence of N-way tethering. Thus, for example, partition 174 may retain the initial payload value until N-way tethering has been finally established, and should not be updated with the payload value indicating the presence of N-way tethering until N-way tethering has been finally established.

In an embodiment, the payload written to partition 174 may comprise credentials which may be used to encrypt or otherwise restrict access to data generated by devices within the PXE infrastructure (e.g., hub 140, hardware 150, or station 190) while display key 170 is connected to the device. For example, the credentials could comprise a public key that is used to encrypt the data, according to a standard cryptographic algorithm, prior to storage in local persistent storage on the device and/or prior to its transmission to another device (e.g., an upstream device). Thus, the unencrypted data would only be readable via decryption using a corresponding private key, which may be stored on user system 130 (e.g., to be used by client application 132) or platform 110 (e.g., to be used by platform 110 or retrieved by client application 132).

Each device within the PXE infrastructure (e.g., hub 140, hardware 150, and station 190) may execute an operating system that is able to recognize and read from and/or write to at least the payload of partition 174 in the onboard persistent storage of any standard display key 170. In response to detecting partition 174 when display key 170 is connected to the device (e.g., inserted into a USB connector of the device), an onboard agent running on the operating system may automatically transmit, over network(s) 120 to platform 110 (or an upstream device), the device's UUID and other data about the device (e.g., an attribute set, status, parameters, metrics, etc.). As is discussed elsewhere herein, the data may then be accessed by a user system 130, tethered to the display key 170, through platform 110 or, in some embodiments, by direct communication with the upstream device (e.g., hub 140 or station 190) on which the data is stored.

1.4. Example Processing Device

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute one or more software modules implementing those functions, processes, or methods) described herein, and may represent components of platform 110, user system(s) 130, hub(s) 140, hardware 150, station(s) 190, and/or other any other processing devices described herein. System 200 can be a server, smart phone, conventional personal computer, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, California.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed onboard agents, application, operating systems, or other software modules) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices (e.g., display 180). Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the onboard agents, disclosed application, or other software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

2. Process Overview

Embodiments of processes for efficient and scalable maintenance of hardware over the entire life cycle of that hardware will now be described in detail. It should be understood that the described processes may be embodied in one or more software modules that are executed by one or more hardware processors (e.g., processor(s) 210 of platform 110, hub 140, user system 130, hardware 150, station 190, etc.), such as the onboard agent(s) or the application discussed herein (e.g., server application 112, client application 132, and/or a distributed application comprising both server application 112 and client application 132). The described processes may be implemented as instructions represented in source code, object code, and/or machine code. These instructions may be executed directly by the hardware processor(s), or alternatively, may be executed by a virtual machine operating between the object code and the hardware processors. In addition, the disclosed software may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

While each of the various processes is illustrated herein with a certain arrangement and ordering of steps, it should be understood that each process may be implemented with fewer, more, or different steps. In addition, for compactness and ease of understanding, the present description does not specifically describe every single possible arrangement and ordering of steps. Rather, only a representative subset of possible embodiments is described herein. Thus, it should be understood that each process may be implemented with a different arrangement and/or ordering of steps than those shown. For example, the illustration of particular steps in a particular order does not imply that those steps must be performed in that order. To the contrary, it will be understood that many such steps may instead be performed in a reverse or different order than shown and/or may be performed in parallel (e.g., in cases where a subsequent step does not depend on the completion of a prior step).

2.1. Attribute Set and Other Data Collection

In an embodiment, each device in the PXE infrastructure, including hub 140, hardware 150, and station 160, may execute an onboard agent, when booted, that transmits data about the device to an upstream device. The data may be transmitted after an initial boot and/or periodically (e.g., at predetermined intervals).

In an embodiment, after an initial boot, the onboard agent automatically probes the components of the device to generate an attribute set. This attribute set may comprise details about one or more hardware components of the device, including, without limitation, the MAC addresses of all installed NICs, attributes of the installed motherboard (e.g., type, model, manufacturer, number of memory slots, etc.), attributes of installed memory modules (e.g., number, type, such as dual in-line memory modules (DIMMs), single in-line memory modules (SIMMs), etc., storage capacity, speed, etc.), attributes of installed hard drives (e.g., number, type, storage capacity, speed, etc.), the serial numbers of installed components (e.g., motherboard, chassis, memory modules, etc.), the current versions of installed firmware, whether or not the device comprises a display port and/or connected display, the IP address assigned to the device, and/or the like.

The onboard agent then transmits this data upstream to a higher node in the PXE infrastructure. For example, hardware 150D may transmit the data directly to hub 140, whereas hardware 150A-150C may transmit their data to stations 190A-190C, respectively. In addition, stations 190A-190C may each transmit their data to hub 140, and hub 140 may transmit its data to platform 110. As described elsewhere herein, at least some of this data may be encrypted (e.g., using credentials stored in the payload on a tethered display key 170) prior to transmission.

In an embodiment, all of the data is collected at platform 110. In other words, hardware 150D relays its data through hub 140 to platform 110, hardware 150A-150C relay their data through stations 190A-190C, respectively, and hub 140 to platform 110, stations 190A-190C relay their data through hub 140 to platform 110, and hub transmits its data to platform 110. Thus, all of the data flows upstream to platform 110, where it may be stored in database 114 and accessed by tethered user systems 130.

However, in another embodiment, data may be collected at other nodes (e.g., any node with access to persistent storage) and need not all be collected at the same node. For example, all of the data may be collected and stored at hub 140 and not transmitted to platform 110. As another example, data may be collected and stored at stations 190 and not transmitted to hub 140. For example, in the case of the rack illustrated in FIG. 1D, each hardware unit 150.1-150.N, which may be a server without onboard persistent storage, may transmit its data to be collected and stored by top-of-the-rack switch 190, which generally will have onboard persistent storage. In these cases, the data may be accessed by user systems 130 which communicate directly with the node on which the data is stored, for example, via a direct wireless or wired connection between a user system 130 and the hub 140 or station 190 on which the data is stored. As discussed elsewhere herein, this data may be encrypted (e.g., using a public key stored in a tethered display key 170) when stored in the onboard persistent storage and decrypted by client application 132 (e.g., using a private key) on user system 130.

2.2. N-Way Tethering Via Display Key

Figure 3A:
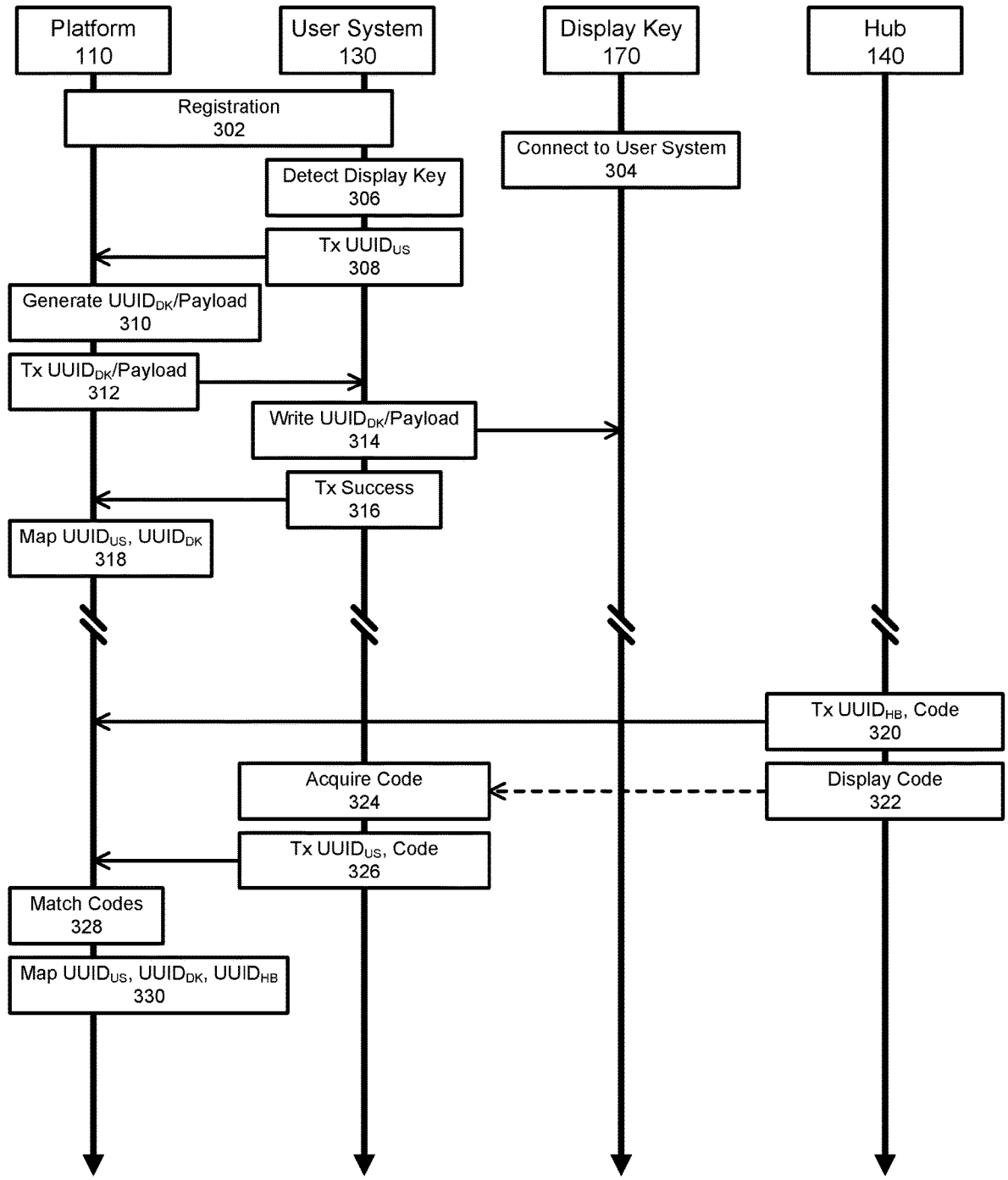
FIG. 3A is a timing diagram illustrating the establishment of N-way tethering between a user system, display key, and hub, according to an embodiment.
Figure 3B:
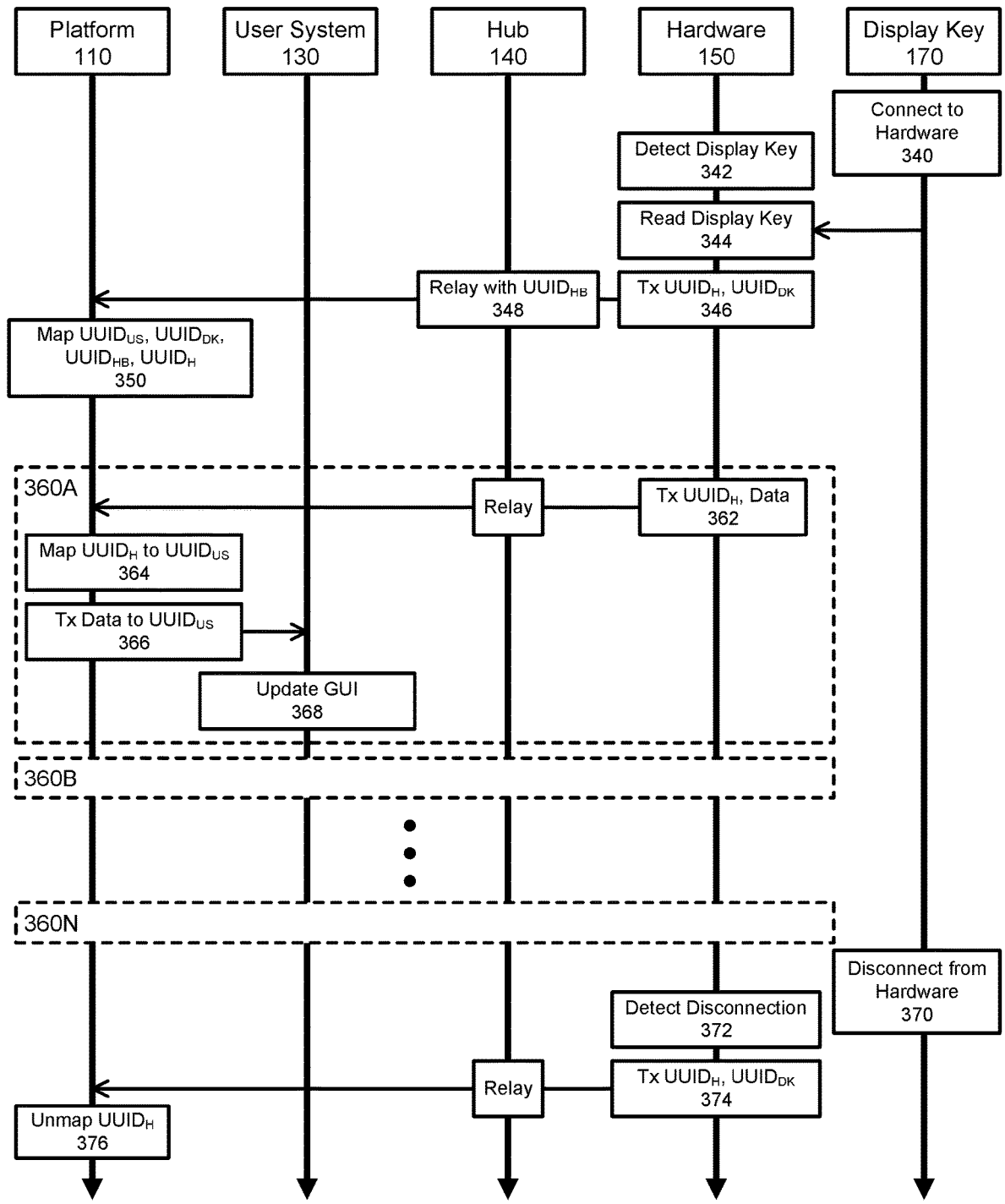
FIG. 3B is a timing diagram illustrating the establishment of an N-way tether between a user system, display key, and hardware via inheritance, according to an embodiment.
Figure 3C:
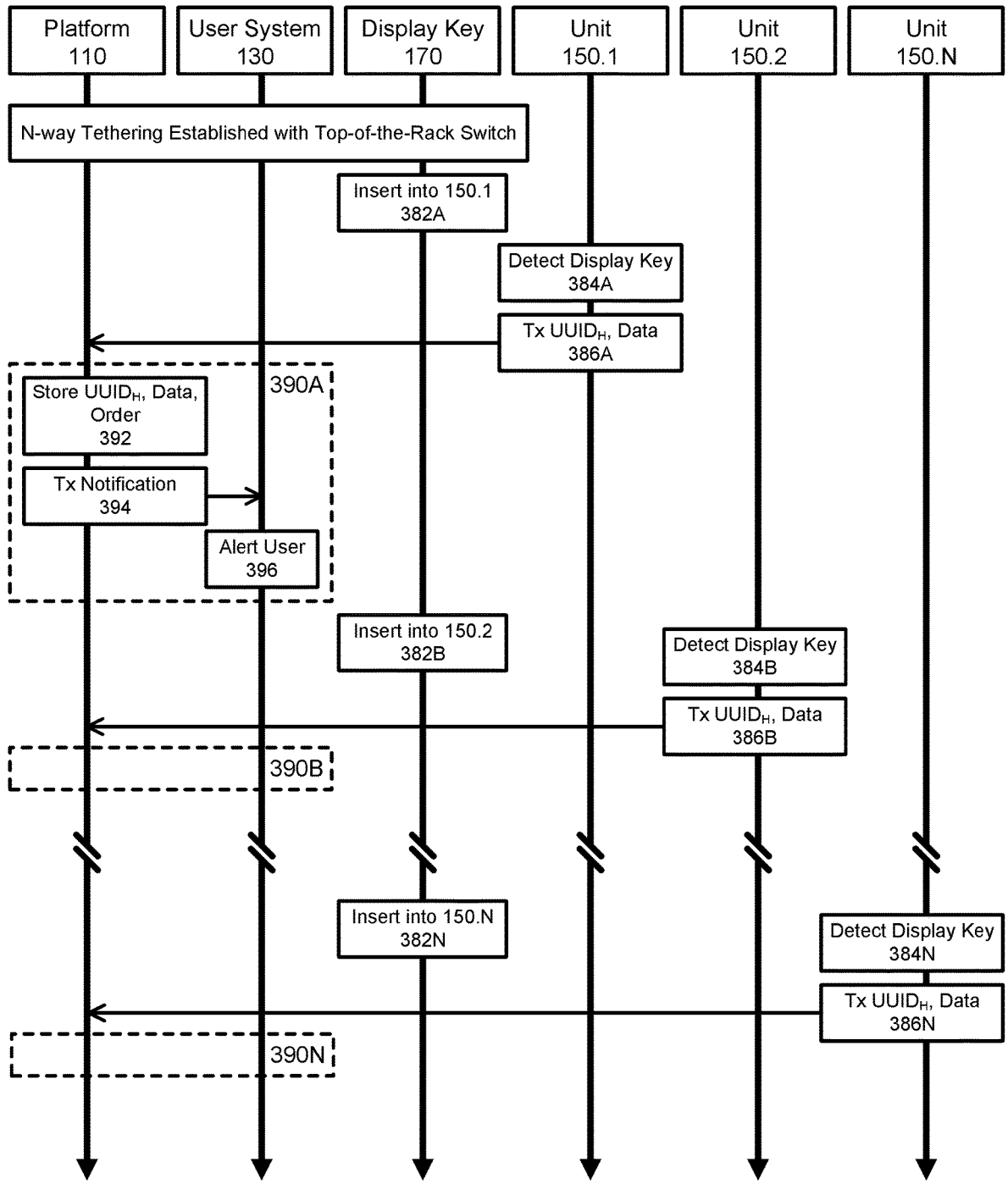
FIG. 3C is a timing diagram of a specific example of how N-way tethering may be used with the rack illustrated in FIG. 1D, according to an embodiment.

FIGS. 3A-3C illustrate processes related to N-way tethering between a user system 130, a display key 170, a hub 140, and hardware 150. In addition, a station 190 without a display port (e.g., 190B in FIG. 1C) can be handled in the same manner as hub 140 in FIG. 3A, whereas a station 190 with a display port (e.g., 190C in FIG. 1C) can be handled in the same manner as hardware 150 in FIG. 3B. It should be understood that platform 110, user system 130, hub 140, hardware 150, and station 190 are communicatively connected via one or more networks (e.g., network(s) 120), and therefore, the various messages described with respect to FIGS. 3A-3C may be transmitted over these network(s) using standard communication protocols.

FIG. 3A is a timing diagram illustrating the establishment of N-way tethering between a user system 130, display key 170, and hub 140, according to an embodiment. Initially, in step 302, user system 130 registers with platform 110. This registration process may be performed in any conventional manner for creating a user account on a platform or registering a user system with a platform. In an embodiment, a user may create a user account on platform 110 by submitting an email address and password as credentials for authentication. Platform 110 may then send a verification email message to the submitted email address. The verification email message may comprise a hyperlink to platform 110 to verify that the user has access to the email account, or a token (e.g., a character string) that the user can input into a graphical user interface of platform (e.g., webpage) to verify that the user has access to the email account. Regardless of how the verification is implemented, platform 110 can create a verified user account for the user once the verification has been completed. Subsequently, the user can sign in to his or her user account on platform 110, via client application 132 on user system 130 (e.g., using the submitted authentication credentials), to access any data for which the user has permissions.

In step 304, the user may connect display key 170 to his or her user system 130. For example, in an embodiment in which display key 170 is a USB flash drive, the user may insert a male USB connector of display key 170 into a female USB connector on user system 130. However, it should be understood that other connections between user system 130 and display key 170 are possible, including any standard wireless connection (e.g., a wireless Bluetooth™ connection) or wired connection.

In step 306, client application 132, executing on user system 130, detects the display key 170 that was connected in step 304. In step 308, client application 132 then transmits a tethering request, comprising the $UUID_{US}$ of user system 130, to platform 110 over network(s) 120.

In step 310, upon receiving the tethering request, transmitted by user system 130 in step 308, platform 110 generates a $UUID_{DK}$, and, in some embodiments, a payload (e.g., comprising credentials, such as a public key, to be used to encrypt data). In step 312, platform 110 then transmits the $UUID_{DK}$ and/or payload, generated in step 310, to user system 130 over network(s) 120.

In step 314, upon receiving the $UUID_{DK}$ and/or payload, transmitted by platform 110 in step 312, user system 130 writes the $UUID_{DK}$ and/or payload to the connected display key 170. For example, client application 132 may write the $UUID_{DK}$ and/or payload to partition 174 in the onboard persistent storage on display key 170. Assuming that the $UUID_{DK}$ and/or payload are successfully written to display key 170, user system 130 transmits a success message to platform 110 over network(s) 120. In the event that the $UUID_{DK}$ and/or payload are not successfully written to display key 170, user system 130 may transmit an error message to platform 110 and/or initiate some other error-handling process (e.g., attempting to rewrite the data one or more number of times, performing a hardware test on display key 170, reformatting display key 170, etc.).

In step 318, upon receiving the success message, transmitted by user system 130 in step 316, platform 110 maps the $UUID_{US}$ (e.g., transmitted in step 308) to the $UUID_{DK}$ (e.g., generated in step 310 and transmitted in step 312). For example, platform 110 may store an association between the $UUID_{US}$ of user system 130 with the $UUID_{DK}$ of display key 170 in database 114. By virtue of this stored association, a two-way tether has been established between user system 130 and display key 170.

In an embodiment, the two-way tether between a user system 130 and display key 170 may persist until overwritten by a two-way tether between a new user system 130 and/or a new display key 170. For example, platform 110 may implement a one-to-one correspondence between $UUID_{US}$ and $UUID_{DK}$, such that any new tether that includes one of these two UUIDs will overwrite any prior tether that includes one of these two UUIDs. Thus, if the tethered display key 170 becomes lost or destroyed, the user simply needs to find a new display key 170 and initiate the two-way tethering process of steps 304-318 again. In addition, since a particular display key 170 is only ever tethered to one user system 130, platform 110 always knows which user system 130 to which to forward data based on the $UUID_{DK}$ of the display key 170 being used. Thus, even if the display key 170 is found and used by another user, that user will not have access to any of the data transmitted within a tether, since only the tethered user system 130 will have access to the data.

Alternatively, platform 110 may allow a one-to-many, many-to-one, or many-to-many correspondence between $UUID_{US}$'s and $UUID_{DK}$'s. In this case, GUI 136 of client application 132 on user system 130 may enable a user to manually untether a display key 130 from a user system 130 via a user operation, the tether may automatically end after a predetermined period of time (e.g., the association between a $UUID_{US}$ and $UUID_{DK}$ is automatically deleted after one day, one week, etc.), and/or the like.

In step 320, hub 140 transmits its $UUID_{HB}$ and a code to platform 110 over network(s) 120. The code may be a previously stored code or may be generated by the onboard agent or other software on hub 140 (e.g., according to an algorithm). Alternatively, the code may be generated by platform 110 and transmitted to hub 140, in which the transmission of the code may be omitted in step 320. Regardless of how the code is determined, in step 322, which may occur before, after, or contemporaneously with step 322, hub 140 displays a visual representation of code 182 (e.g., barcode, QR code, character string, etc.). Steps 320 and/or 322 may be initiated, for example, by a user operation at hub 140 and/or user system 130.

In step 324, client application 132 on user system 130 acquires code 182, which has been displayed by hub 140 on display 180 in step 322. Step 324 may comprise client application 132 prompting the user (e.g., via GUI 136) to capture the visual representation of code 182, and a user positioning and operating an integrated or connected camera of a mobile user system 130 so as to capture an image of the visual representation of code 182 on display 180. Alternatively, step 324 could comprise a user inputting a human-readable code 182 (e.g., character string) into mobile user system 130 (e.g., by typing characters into a text input of GUI 136 using a virtual keyboard overlaid on GUI 136). Regardless of how code 182 is acquired by client application 132 (and optionally decoded from the visual representation), in step 326, client application 132 of user system 130 transmits a message, comprising the $UUID_{US}$ of user system 130 and code 182, to platform 110 over network(s) 120.

In step 328, upon receiving code 182 from either hub 140 (e.g., transmitted in step 320) or user system 130 (e.g., transmitted in step 326), platform 110 attempts to match the received code 182 to a previously received code 182. If platform 110 has received codes 182 from both hub 140 and user system 130, a match will be identified. Assuming such a match is identified, in step 330, platform 110 stores a mapping between at least the $UUID_{US}$ of user system 130 (e.g., received by virtue of step 326) and the $UUID_{HB}$ of hub 140 (e.g., received by virtue of step 320). This mapping may be stored in database 114 of platform 110. It should be understood that because the $UUID_{US}$ of user system 130 is mapped to both the $UUID_{DK}$ of display key 170 (e.g., in step 318) and the $UUID_{HB}$ of hub 140 (e.g., in step 330), there is now a three-way tether between user system 130, display key 170, and hub 140. This full mapping, representing the entire three-way tether, may be derived via these relationships between mappings stored in database 114 (e.g., using a relational database) or explicitly stored as a full, discrete mapping in database 114. In either case, the mapping represents a permission for user system 130 to access PXE-related data collected by hub 140.

In an embodiment, platform 110 and/or hardware 150 could take into account security policies to restrict N-way tethering to only those user systems 130 on a white list (e.g., comprising known $UUID_{US}$'s). Alternatively or additionally, platform 110 and/or hardware 150 could prohibit N-way tethering by user systems 130 on a black list (e.g., comprising prohibited $UUID_{US}$'s). For example, platform 110 could compare a received $UUID_{US}$, transmitted in step 308 and/or 326, to a white list and/or black list, and only establish the mapping in step 318 and/or 330 when the received $UUID_{US}$ appears on the white list and/or does not appear on the black list.

In an embodiment, any hardware 150 and/or station 190 that has a display port may be tethered to user system 130 and display key 170 in the same manner as hub 140. In other words, an onboard agent of any particular hardware 150 and/or station 190 may detect the presence of a display 180, and responsively implement steps 320 and 322. As discussed above, these steps, in conjunction with steps 324-330, would result in a mapping, between the hardware and/or station 190, user system 130, and display key 170, being stored on platform 110 (e.g., in steps 318 and/or 330).

On the other hand, any hardware 150 and/or station 190 that does not have a display port may automatically inherit the N-way tether of its parent node within the PXE infrastructure. For example, a display-less hardware 150 may inherit the N-way tether of its station 190, if one exists between it and hub 140, or may inherit the N-way tether of hub 140, if no station 190 exists between it and hub 140. Similarly, a display-less station 190 may inherit the N-way tether of hub 140.

FIG. 3B is a timing diagram illustrating the establishment of an N-way tether between a user system 130, display key 170, and hardware 150 via inheritance, according to an embodiment. In FIG. 3B, it is assumed that user system 130, display key 170, and hub 140 are in an established N-way tether by virtue of the process illustrated in FIG. 3A. Assuming hardware 150 does not have a display port, hardware 150 automatically inherits this N-way tether from hub 140.

In an embodiment, the inheritance for a downstream node without a display port is implemented by the upstream node in the network hierarchy of the PXE infrastructure. For instance, hub 140 is an upstream node from station 190 and hardware 150, and station 190 is an upstream node from hardware 150. Conversely, hardware 150 is a downstream node from station 190 and hub 140, and station 190 is a downstream node from hub 140. As described above, an onboard agent of a downstream node may, upon an initial boot, probe its hardware components to generate an attribute set, and transmit that attribute set upstream to an upstream node. The upstream node may then parse the attribute set, received from the downstream node, to determine whether or not the downstream node comprises a display port (e.g., the presence or absence of a display port may be one of the attributes within the attribute set). If the upstream node determines that the downstream node does not comprise a display port, it stores an indication that any N-way tether of which it is a part should also include the downstream node, to thereby extend its N-way tether(s) to the downstream node. Additionally or alternatively, the upstream node may transmit a message to the downstream node and/or to platform 110 to indicate that the downstream node has inherited the upstream node's N-way tether(s).

In step 340, display key 170, which has already been associated in a three-way tether with user system 130 and hub 140 (e.g., in step 330), is connected to hardware 150. For example, in an embodiment in which display key 170 is a USB flash drive, the user may insert a male USB connector of display key 170 into a female USB connector on hardware 150. However, it should be understood that other connections between hardware 150 and display key 170 are possible, including any standard wireless connection (e.g., a wireless Bluetooth™ connection) or wired connection.

In step 342, an onboard agent, executing on hardware 150, detects the display key 170 that was connected in step 340. In step 344, hardware 150 reads the $UUID_{DK}$ and/or payload (e.g., credentials) from the connected display key 170. For example, the onboard agent on hardware 150 may read the $UUID_{DK}$ and/or payload from partition 174 in the onboard persistent storage on display key 170. The presence of a valid payload (i.e., not a null or other initial default value) may indicate to hardware 150 that display key 170 is tethered. Thus, the insertion of a display key 170 with a valid payload in partition 174 may act as a request to the onboard agent of hardware 150 to share the data about hardware 150 with the user system 130 that is tethered to the inserted display key 170.

In step 346, the onboard agent, executing on hardware 150, transmits a tethering request, comprising the $UUID_H$ of hardware 150 and $UUID_{DK}$ of display key 170, to platform 110 over network(s) 120. In step 348, this tethering request may be relayed through hub 140, and potentially a station 190 between hardware 150 and hub 140. The onboard agent or other software module on each relaying device may add the UUID of that device to the request (e.g., hub 140 may add the $UUID_{HB}$ of hub 140, and/or station 190 may add the UUIDs of station 190).

In step 350, upon receiving the tethering request, transmitted by hardware 150 in step 346, platform 110 stores a mapping between at least the $UUID_H$ of hardware 150 and the $UUID_{DK}$ of display key 170 (e.g., both received by virtue of step 346). This mapping may be stored in database 114 of platform 110. It should be understood that, because the $UUID_{DK}$ of display key 170 is mapped to the $UUID_{US}$ of user system 130 (e.g., in step 318) and the $UUID_{US}$ of user system 130 is mapped to the $UUID_{HB}$ of hub 140 (e.g., in step 330), there is now a four-way tether between user system 130, display key 170, hub 140, and hardware 150.

Essentially, hardware 150 has joined the N-way tether between user system 130 and hub 140 via display key 170.

Subsequently, one or more iterations of step set 360 (e.g., iterating 360A-360N) may be performed for as long as display key 170 remains connected to hardware 150. In each step set 360, the onboard agent on hardware 150 transmits its $UUID_H$ and data to platform 110 in step 362. This transmission may be relayed through hub 140, and potentially a station 190, which may each add its own UUID to the transmission (e.g., in the same or similar manner as in step 348). The data in the transmission may represent the status, parameters (e.g., the IP address assigned to hardware 150), metrics, and/or the like of hardware 150, including PXE-related information (e.g., the status of a task being executed by hardware 150). As discussed elsewhere herein, the data may be encrypted prior to transmission using, for example, credentials (e.g., a public key) within the payload of display key 170 (e.g., read in step 344).

In step 364, after receiving the data, transmitted by hardware 150 in step 362, platform 110 may map the $UUID_H$ of hardware 150 to the $UUID_{US}$ based on the mapping stored in step 350. In step 366, based on this mapping, platform 110 may provide the data, in an unaltered, altered, or formatted form, to the user system 130 (e.g., user account) associated with the mapped $UUID_{US}$. In step 368, upon receiving the data, transmitted by platform 110 in step 366, client application 132 on user system 130 may update GUI 136 to present the data (e.g., in a visual report format) to the user.

In an embodiment, hardware 150 may perform step 362 periodically, even when no display key 170 is connected to hardware 150. Alternatively, hardware 150 may perform step 362 periodically only when a display key 170 is connected to hardware 150. As another alternative, hardware 150 may perform step 362 when there is new data to report (e.g., a change in status), even when no display key 170 is connected to hardware 150, or only when a display key 170 is connected to hardware 150.

In an embodiment, platform 110 may perform steps 364-366 in response to a polling message (not shown) transmitted by user system 130 to platform 110 over network(s) 120. For example, client application 132 on user system 130 may periodically poll platform 110 for new data or irregularly poll platform 110 for new data (e.g., in response to a user operation through GUI 136), and platform 110 may respond by mapping the $UUID_{US}$ in the polling message to received data associated with the $UUID_H$ of hardware 150 in step 364, and transmitting the associated data to user system 130 in step 366. Alternatively, platform 110 may push the data received from hardware 150 to user system 130, in real time or near real time, as the data are received or at predefined intervals.

Notably, the data (e.g., status) can be displayed to a user and a user may interact with this information without the need of input and output devices connected to hardware 150. Rather, all input and output needs are handled by user system 130 via its N-way tether to hardware 150. Thus, the need for a dedicated display, keyboard, mouse, or input/output peripheral (e.g., on a rolling cart) is eliminated.

In step 370, display key 170 is disconnected from hardware 150. For example, in an embodiment in which display key 170 is a USB flash drive, the user may remove a male USB connector of display key 170 from a female USB connector on hardware 150. In an embodiment in which display key 170 is wirelessly paired with hardware 150, the disconnection may comprise de-pairing display key 170 from hardware 150.

In step 372, the onboard agent, executing on hardware 150, detects the disconnection of display key 170 in step 370. In step 374, hardware 150 may transmit a de-tethering request, comprising, for example, the $UUID_H$ of hardware 150 and the $UUID_{DK}$ of display key 170, to platform 110 over network(s) 120. As in step 348, the de-tethering request, transmitted by hardware 150 in step 374, may be relayed through hub 140 (and potentially a station 190). Then, in step 376, upon receiving the de-tethering request, transmitted by hardware 150 in step 374, platform 110 deletes the mapping between the $UUID_H$ of hardware 150 and at least the $UUID_{DK}$ of display key 170 and/or the $UUID_{US}$ of user system 130, such that hardware 150 is no longer in the N-way tether with user system 130. Accordingly, user system 130 will no longer receive data from hardware 150 through platform 110 via step set 360. Alternatively, other methods of de-tethering may be used. For example, a prior tether between user system 130 and hardware 150 may be overwritten when display key 170 is inserted into another hardware 150, thereby replacing the prior tether with a new tether. As another example, the tether could automatically expire after a certain period of time (e.g., a few minutes, an hour, a day, etc.).

In an embodiment, whenever a device (e.g., hub 140, hardware 150, or station 190) is involved in its first N-way tether, platform 110 stores data about the device (e.g., an attribute set transmitted by an onboard agent of the device), such that the device becomes and remains known to platform 110. Thus, over time, platform 110 may learn the infrastructure and/or topology of an entity's local PXE infrastructure. In addition, platform 110 may associate each learned PXE infrastructure with a particular entity, and manage this infrastructure information and tethering for a plurality of different entities and their respective local PXE infrastructures. For example, platform 110 may enable granular permissions, such that an administrator for an entity can associate certain devices or groups of devices with certain user systems 130 or user accounts, such that a particular user system 130 or user account is only permitted to form N-way tethers with a specified subset of devices (e.g., only a certain branch of the network hierarchy, such as a particular station 190 and its downstream hardware 150, or a particular hub 140 and its downstream stations 190 and hardware 150, etc.) within the entity's PXE infrastructure. These permissions could be implemented using device-specific or group-specific white and/or black lists, or by other means known in the art.

FIG. 3C is a timing diagram of a specific example of how N-way tethering may be used with the rack illustrated in FIG. 1D, according to an embodiment. As illustrated in FIG. 1D, a rack may comprise a top-of-the-rack switch as a station 190 and a plurality of hardware units 150 (e.g., each hardware unit 150 being a server). N-way tethering may be established between user system 130, display key 170, and top-of-the-rack switch 190 in the same or similar manner as described with respect to FIG. 3A (e.g., if top-of-the-rack switch 190 has a display port) or steps 340-350 in FIG. 3B (e.g., if top-of-the-rack switch 190 does not have a display port, and therefore, inherits the N-way tether of hub 140). Platform 110 may recognize that station 190 is a top-of-the-rack switch (e.g., based on an attribute set transmitted by the onboard agent on top-of-the-rack switch 190, based on a user operation performed at GUI 136 of client application 132 on user system 130, etc.). Platform 110 may initiate the special operation, illustrated in FIG. 3B, for identifying a physical location of each hardware unit 150.1-150.N within the rack, based, for example, on a user operation performed at GUI 136 of client application 132 on the user system 130 that is tethered to top-of-the-rack switch 190. Once this special operation has been initiated, display key 170 may be removed from top-of-the-rack switch 190 and inserted by the user into each hardware unit 150 in the order in which hardware units 150 are positioned within the rack, for example, from top to bottom (e.g., 150.1, 150.2, 150.3, . . . 150.N), to collect their physical locations within the rack.

In step 382A, display key 170 is inserted into the first hardware unit 150.1. When display key 170 is inserted into hardware unit 150.1, the onboard agent on hardware unit 150.1 detects display key 170 and partition 174 in step 384A. In response to this detection, the onboard agent on hardware unit 150.1 automatically transmits a message, comprising its $UUID_H$ and data about hardware unit 150.1, to platform 110 in step 386A. The transmitted data may comprise the attribute set, described elsewhere herein, including, for example, the IP address assigned to the hardware unit 150, the status of the hardware unit 150 and/or tasks executing on the hardware unit 150, parameters used by the hardware unit 150, metrics of the hardware unit 150, and/or the like.

Upon receiving the message, transmitted by hardware unit 150.1 in step 386A, platform 110 initiates a step set 390. Specifically, in step 392, platform 110 stores the transmitted $UUID_H$ and data about hardware unit 150.1 in database 114. In addition, platform 110 stores an indication of the order in which the data were received (e.g., indicates that data from hardware unit 150.1 were received first). This order represents the physical location of hardware unit 150.1 within the rack (i.e., the hardware unit 150.1 is at the first physical location within the rack). In step 394, platform 110 transmits a notification to the user system 130 that is in an N-way tether with top-of-the-rack switch 190 and display key 170. The notification may indicate that the data has been received from hardware unit 150.1. In step 396, upon receiving the notification, transmitted by platform 110 in step 394, client application 132 on user system 130 alerts the user of user system 130. The alert may comprise a haptic alert (e.g., vibration of the housing of user system 130), an audio alert (e.g., a predefined sound through a speaker of user system 130), and/or a visual alert (e.g., text and/or image displayed in GUI 136 of user system 130). By sensing the alert, the user is made aware that the data has been successfully transmitted from hardware unit 150.1 to platform 110.

Thus, the user may then remove display key 170 from hardware unit 150.1 and, in step 382B, insert display key 170 into the next hardware unit 150.2 in the order. Hardware unit 150.2 will detect display key 170 in step 384B, and transmit its $UUID_H$ and data to platform 110 in step 386B, in the same manner as hardware unit 150.1 did in steps 384A and 386A, respectively. In addition, step set 390B will be performed in the same manner as step set 390A. Notably, since the transmission from hardware unit 150.2 was received second during the special operation, platform 112 will store an indication that hardware unit 150.2 is in the second physical location within the rack.

These steps can be performed iteratively for all of hardware units 150, including the final hardware unit 150.N. This special operation may be ended based, for example, on a user operation performed at GUI 136 of client application 132 on user system 130, after a timeout period (e.g., five minutes, ten minutes, etc.) has elapsed without display key 170 being inserted into another hardware unit 150, upon a determination that data for N units have been collected (e.g., based on an attribute set for top-of-the-rack switch 190 which specifies N, a user specification of N, etc.), and/or the like.

The data collected by the special operation may be stored on hub 140, platform 110, and/or on the persistent storage of top-of-the-rack switch 190, using credentials provided by user system 130. User system 130 may receive these credentials from a user via GUI 136 and transmit the received credentials to the storing device, or may provide an IP address (e.g., of hub 140, platform 110, etc.) from which the storing device may obtain the credentials. Alternatively, the establishment of an N-way tether that includes the storing device (e.g., top-of-the-rack switch 190) may result in credentials being provided to the storing device, to be used (e.g., by encrypting the data) when the storing device is storing the data on its local persistent storage.

Notably, in each respective step 392, platform 110 stores an indication of the order in which each hardware unit 150 reported its data (i.e., in each respective step 386). Thus, assuming that display key 170 is inserted into each hardware unit 150 in the order in which they are physically positioned below top-of-the-rack-switch 190, platform 110 will automatically capture the physical order—and therefore, the physical location—of each hardware unit 150.1-150.N within the rack. In addition, as discussed above, the data transmitted in each respective step 386 may comprise the IP address assigned to the respective hardware unit 150. Thus, platform 110 now has a mapping between the IP address of each hardware unit 150 and its physical location within the rack. In this manner, platform 110 can map the IP addresses of a plurality of hardware units 150 in a plurality of the racks (e.g., all of the racks in a data center) to their physical locations in a scalable manner and regardless of whether the IP addresses are statically or dynamically assigned.

2.3. PXE with Separable Task Graph

Figure 4A:
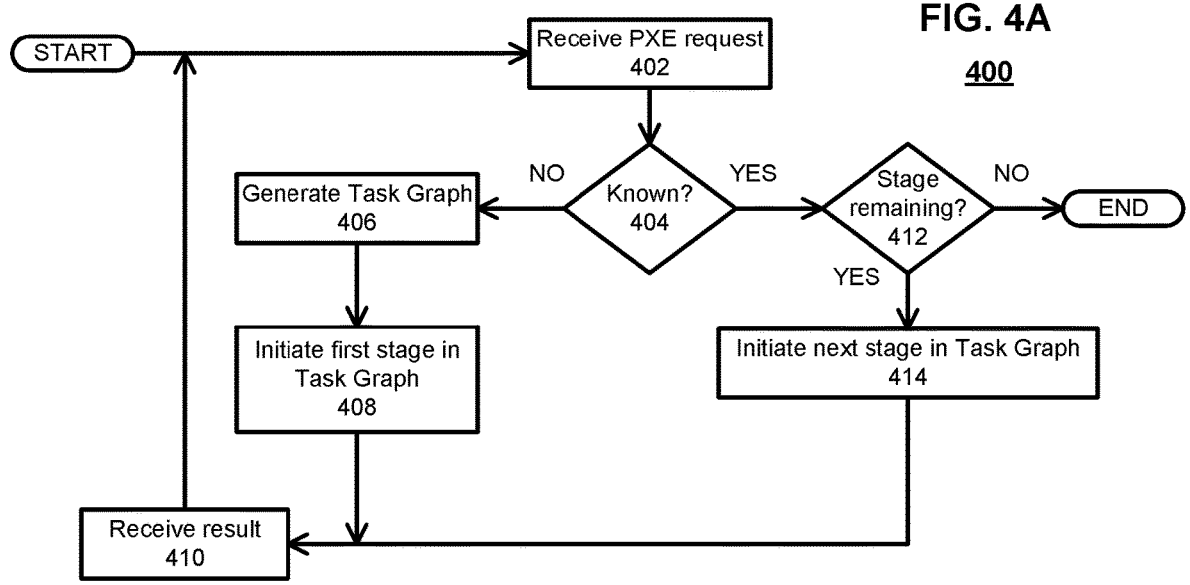
FIGS. 4A and 4B are flowcharts illustrating a PXE process that utilizes a separable task graph from two different perspectives, according to embodiments.

FIG. 4A is a flowchart illustrating a PXE process 400 that utilizes a separable task graph, according to an embodiment. Process 400 is illustrated from the perspective of a PXE server 164, and therefore, may be implemented by PXE server 164 (e.g., a software-based server on hub 140 or station 190). It should be understood that process 400 represents an improvement to PXE server 164. For example, one advantage is that process 400 enables the various stages within a multi-stage PXE task graph to be separated into sub-graphs to be performed by different entities.

In step 402, a PXE request is received from PXE-enabled hardware 150 or station 190. For simplicity of description, it will be assumed that the PXE request is received from hardware 150. However, it should be understood that process 400 may be implemented in an identical or similar manner for station 190.

The PXE request may comprise an identifier of the requesting hardware 150. For example, the identifier may be a MAC address associated with the requesting hardware 150 (e.g., the MAC address of the NIC that sent the PXE request). Based on this identifier, in step 404, PXE server 164 determines whether or not the requesting hardware 150 is already known. Specifically, PXE server 164 may compare the identifier to a plurality of attribute sets (e.g., including the MAC addresses of all NICs in all known hardware 150) that each uniquely describe a particular hardware 150. If the identifier in the PXE request matches an attribute set (e.g., matches an identifier within the attribute set), PXE server 164 determines that the requesting hardware 150 is known. Otherwise, PXE server 164 determines that the requesting hardware 150 is unknown. If the requesting hardware is determined to be unknown (i.e., "NO" in step 404), process 400 proceeds to step 406. Otherwise, if the requesting hardware is determined to be known (i.e., "YES" in step 404), process 400 proceeds to step 412.

In step 406, PXE server 164 generates a task graph for the unknown hardware 150. Generation of a task graph may comprise creating a task graph from a set of rules or copying a predefined task graph (e.g., based on attributes of hardware 150). In either case, the task graph may comprise one or more stages, with each stage comprising one or more tasks to be executed by hardware 150. In an embodiment, the task graph may be generated or supplemented based on the attributes of hardware 150 as they are acquired over one or more iterations of process 400 (e.g., as captured by an attribute set generated from probing hardware 150). For example, different task graphs may be generated for different types of hardware 150, hardware 150 with different components, different layouts of components within hardware 150, and/or the like.

In step 408, PXE server 164 initiates the first stage in the task graph generated in step 406. This may involve providing at least an initial operating system to hardware 150 (e.g., by transmitting the operating system to hardware 150, or transmitting a location from which the operating system may be downloaded by hardware 150) to be booted by hardware 150. After the first stage has been initiated, PXE server 164 may receive a result of the stage (e.g., indicating successful completion of the stage, a failure or error during the stage, metrics or other attributes acquired during performance of the stage, etc.) from hardware 150 in step 410, and then wait to receive a new PXE request in step 402.

In an embodiment, the first stage in the task graph may comprise acquiring an attribute set for the hardware 150. For instance, the first stage may comprise hardware 150 downloading a lightweight operating system which is designed to detect attributes of the various components of hardware 150. This may include acquiring the attribute set described elsewhere herein. Essentially, the attribute set comprises a plurality of attributes of hardware 150 that ensure that hardware 150 can be later identified, even if one attribute changes. This attribute set may be reported by hardware 150 to PXE server 164 in step 410, and stored by PXE server 164 for subsequent matching of the now-known hardware 150 in a future iteration of step 404. Other attributes (e.g., metrics), reported in the results of one or more iterations of step 410 for one or more stages in the task graph, may also be added to the stored attribute set for known hardware 150 over time, and may optionally be used to supplement that task graph for hardware 150 over time. In addition, other results (e.g., the status of a task), received in step 410, may be stored in a history associated with the attribute set for a given hardware 150, so as to be retrievable once the given hardware 150 has been matched to that attribute set.

In step 412, PXE server 164 retrieves the task graph for the known hardware 150 (e.g., generated in a prior iteration of step 406). In addition, PXE server 164 may retrieve the attribute set that matched the hardware 150 in step 404 and/or the history associated with that attribute set. As discussed above, this attribute set may comprise various attributes of the hardware 150 acquired in one or more prior iterations of step 410. The retrieved attribute set and/or history may be used to determine the next stage, if any, to be initiated from the task graph. For example, PXE server 164 may refer to the result of the most recently reported stage in the history, and select the next stage to be initiated based on that result (e.g., initiate the next stage in the task graph if the most recent stage was successfully completed, and initiate an error-handling stage or repeat the most recent stage if not successfully completed). In an embodiment, PXE server 164 may take versions into account, when selecting the next stage, so that longer running processes are not disturbed by intervening updates. For example, PXE server 164 may cache or otherwise store a snapshot of some or all external dependencies, when generating the task graph, to be used when executing the task graph. This ensures that, regardless of how long the task graph may take to complete, the external dependencies to be served will be those that existed at the time that the task graph was generated.

Accordingly, in step 412, PXE server 164 determines, based on the retrieved task graph and the retrieved attribute set and/or history, whether any stages of the task graph remain to be completed and, if so, the next stage to be initiated. If a next stage remains to be completed (i.e., "YES" in step 412), PXE server 164 initiates that next stage in step 414. Step 414 may be similar to step 408, and the initiated stage may similarly return results in step 410. Otherwise, if no stages remain to be completed (i.e., "NO" in step 412), process 400 ends for a given hardware 150.

Figure 4B:
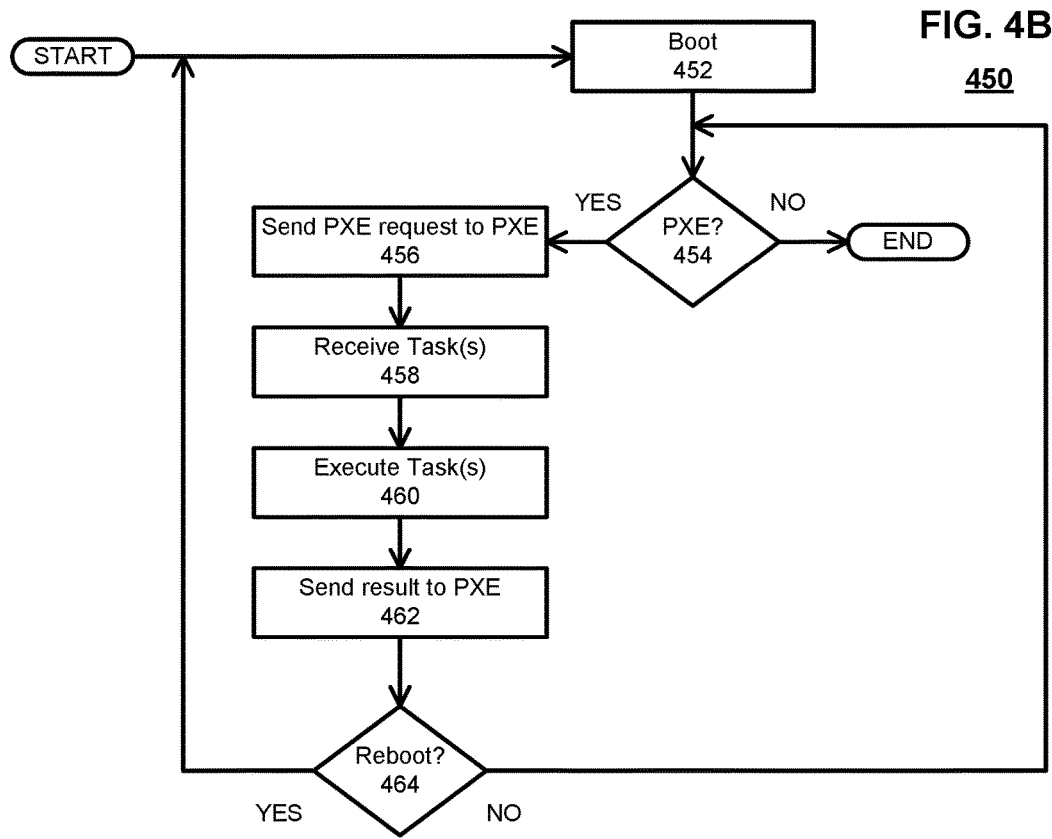

FIG. 4B is a flowchart illustrating a PXE process 450 that utilizes a separable task graph, according to an embodiment. Process 450 operates in conjunction with process 400, but is illustrated from the perspective of the hardware 150 or station 190 that is requesting PXE service. Therefore, process 450 may be implemented by hardware 150 or station 190. For simplicity of description, it will be assumed that process 450 is implemented by hardware 150. However, it should be understood that process 450 may be implemented in an identical or similar manner for station 190.

In step 452, hardware 150 boots. Then, in step 454, hardware 150 determines whether or not PXE service is required. If PXE service is required (i.e., "YES" in step 454), process 450 proceeds to step 456. Otherwise, if PXE service is not required (i.e., "NO" in step 454), process 450 ends.

In step 456, hardware 150 sends a PXE request to PXE server 164. The PXE request, sent from hardware 150 to PXE server 164 in step 456 of process 450, corresponds to the PXE request, received from hardware 150 by PXE server 164 in step 402 of process 400. Thus, as discussed above, the PXE request may comprise an identifier of the requesting hardware 150 (e.g., the MAC address of the transmitting NIC).

In step 458, hardware 150 receives one or more tasks, to be completed within a current stage of the task graph, from PXE server 164. In an embodiment, step 458 in process 450 corresponds to step 408 or 414 in process 400. In other words, the initiation of a current stage by PXE server 164 may comprise the provision, to hardware 150, of one or more tasks to be performed by hardware 150 (e.g., in the form of a configuration file). This may involve a task of downloading an operating system or other software image, to hardware 150, that is booted to execute additional task(s) at hardware 150 and reports the results of those tasks to PXE server 164. In any case, the task(s) are executed in step 460, and the results of any executed task(s) are reported by hardware 150 to PXE server 164 in step 462. The result, sent from hardware 150 to PXE server 164 in step 462 of process 450, corresponds to the result, received from hardware 150 by PXE server 164 in step 410 of process 400.

In step 464, hardware 150 determines whether or not a reboot is required. For example, some stages in the task graph for hardware 150 may require a reboot (e.g., to boot a new operating system image related to a firmware update). If a reboot is required (i.e., "YES" in step 464), hardware 150 reboots itself in step 452. Otherwise, if no reboot is required (i.e., "NO" in step 464), hardware 150 may return to step 454 to determine whether the PXE service is still required (e.g., for the initiation of a new stage).

Notably, the improved PXE processes 400 and 450 utilize direct communications between tasks being executed on hardware 150 and PXE server 164 to share data, such as the current and/or final status of the task, attributes of hardware 150, metadata, and/or the like. This enables PXE server 164 to monitor the task(s) in each stage (e.g., which tasks have been completed) even after reboots of hardware 150, identify the next stage to be performed based on a task graph associated with hardware 150 (e.g., taking into account the results shared by the tasks), and/or the like. Advantageously, because, PXE server 164 can track the progress of hardware 150 through the task graph, the various stages of the task graph can be divided into sub-graphs and assigned to the PXE servers 164 of different entities.

As an additional advantage, since an attribute set is collected for each hardware 150 (e.g., in step 410 for the first stage of the task graph), each hardware 150 can be identified for tracking purposes, regardless of which components it uses. For example, as discussed above, the MAC addresses of all NICs within hardware 150 may be collected in the attribute set. Thus, PXE server 164 is able to correlate all PXE requests from NICs within a single hardware 150 to that single hardware 150, regardless of which NIC is used. For example, assume that hardware 150 comprises a first NIC with a first MAC address and a second NIC with a second MAC address. Hardware 150 uses the first NIC with the first MAC address to send an initial PXE request to PXE server 164. In this case, since hardware 150 is unknown, PXE server 164 initiates a first stage that collects an attribute set from hardware 150, including the first MAC address of the first NIC and the second MAC address of the second NIC, and PXE server 164 stores this attribute set in association with a task graph generated for hardware 150. Then, if hardware 150 uses the second NIC with the second MAC address to send a subsequent PXE request (e.g., after a reboot), PXE server 164 will be able to match the second MAC address to the second MAC address in the stored attribute set to retrieve the associated task graph. Thus, regardless of which NIC is used to send the PXE request by hardware 150, PXE server 164 will be able to retrieve the appropriate attribute set, task graph, and associated history of results.

Furthermore, each hardware 150 can be identified for tracking purposes, even if components within that hardware 150 change over time. For example, during assembly or over the life cycle of hardware 150, a NIC may be replaced with a new NIC. In this case, if the new NIC transmits a PXE request to PXE server 164, PXE server 164 may initially treat hardware 150 as unknown (e.g., in steps 404-408). However, once a new attribute set is acquired (e.g., in step 410), PXE server 164 may match the new attribute set to the existing attribute set for hardware 150 based on the other components within hardware 150 (i.e., other than the new NIC). For instance, assume hardware 150 comprises a first NIC with a first MAC address, and a second NIC with a second MAC address, such that a first attribute set is acquired with the first and second MAC address. If the first NIC is subsequently replaced (e.g., due to a hardware failure) with a third NIC with a third MAC address, a second attribute set will be acquired with the second and third MAC addresses. In this case, the second attribute set can be matched to the first attribute set based on both attribute sets comprising the second MAC address. Accordingly, the attribute sets may be merged (e.g., adding the third MAC address and deleting the first MAC address), and the task graph and history associated with the first attribute set may be retrieved for determining the next stage to be executed for hardware 150.

2.4. Task Graph

Figure 5A:
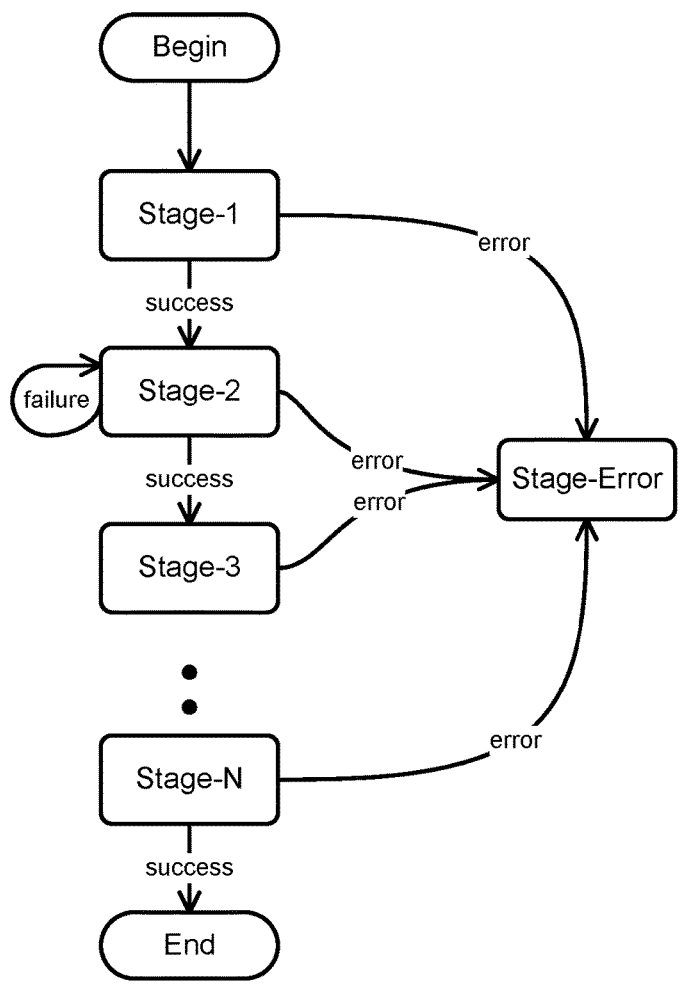
FIGS. 5A and 5B illustrate examples of a task graph, according to embodiments.

FIG. 5A illustrates an example of a task graph 500 (e.g., generated in step 406 of process 400), according to an embodiment. The task graph comprises a plurality of stages. In an embodiment, each stage defines an operating system to be served and booted by hardware 150, as well as the conditions under which that stage should transition to another stage (or repeat itself). A particular task graph 500 or rules for generating a task graph 500 may be authored by IT personnel and stored for retrieval on PXE server 164. A plurality of task graphs 500 may be generated in this manner, and be retrieved for a particular hardware 150 based on attributes of that hardware 150. Each task graph 500 may be defined programmatically, with an API that may be invoked by hardware 150, for example, via remote procedure calls (RPCs).

As one example, Stage-2 in task graph 500 may comprise a task of updating firmware on hardware 150, whereas preceding Stage-1 may comprise a pre-update task, and subsequent Stage-3 may comprise a post-update task. For example, Stage-1 may comprise hardware 150 downloading and booting into a lightweight operating system to probe hardware 150 in order to determine exactly which firmware should be served after a subsequent reboot. Next, Stage-2 may comprise downloading the firmware and performing the firmware update. Then, Stage-3 may comprise testing hardware 150 to ensure that the updated firmware is performing properly.

Completion of a stage (e.g., Stage-1) would be reported, for example, to PXE server 164 in step 462 of process 450, so that PXE server 164 may transition hardware 150 to the next stage (e.g., from Stage-1 to Stage-2), for example, after hardware 150 reboots. On the other hand, if an error occurs during a stage (e.g., due to a failure reported by a resource of hardware 150, premature termination of a resource of hardware 150, etc.), PXE server 164 may transition hardware 150 from the stage in which the error occurred to Stage-Error. In general, upon successful completion of a stage, PXE server 164 may transition hardware 150 to the next stage in the task graph, whereas upon encountering an error in a stage, PXE server 164 may transition hardware 150 to a stage which comprises error handling. In some cases (e.g., as illustrated with respect to Stage-2), a failure of a stage to complete may result in a transition to the same stage (i.e., a re-execution of the failed stage).

As another example of a multi-stage task graph 500, Stage-1 may comprise hardware 150 booting a first operating system that determines the type of hardware 150 (e.g., generating an attribute set, as described elsewhere herein). Next, Stage-2 may comprise hardware 150 booting a second operating system that stress tests hardware 150 before a firmware update. Then, Stage-3 may comprise hardware 150 booting into a third operating system, created to update the firmware on hardware 150, based on the type of hardware determined in Stage-1 and/or the stress tests performed in Stage-2. A Stage-4 may comprise hardware 150 booting into a fourth operating system that stress tests hardware 150 after the firmware update, and a Stage-5 may comprise hardware 150 installing a fifth and final operating system to be used in a production environment.

Notably, a firmware update may be performed across a plurality of stages, rather than in a single stage. For example, firmware for a plurality of components of hardware 150 may be updated in multiple stages. As an illustration, the firmware for the basic input/output system (BIOS) of hardware 150 may be updated first, the firmware for the Redundant Array of Independent Disks (RAID) of hardware 150 may be updated second, the firmware for the IPMI of hardware 150 may be updated third, and so on and so forth.

Figure 5B:
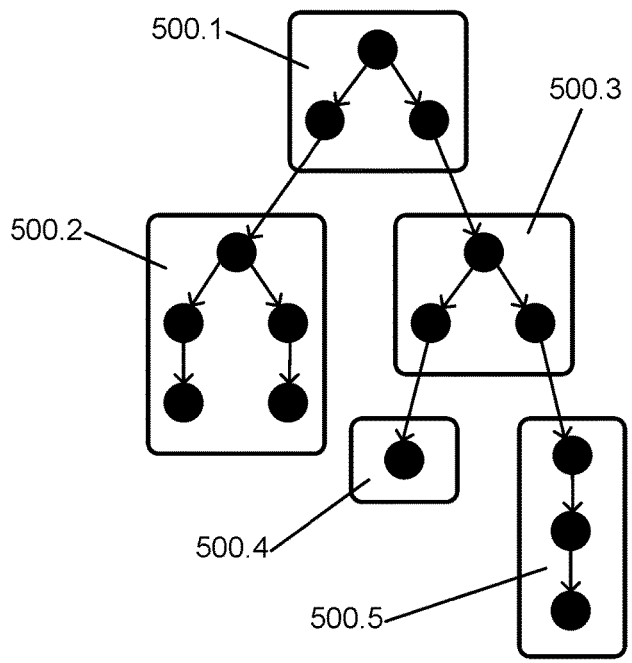

FIG. 5B illustrates the separability of an example task graph 500, according to an embodiment. As illustrated, the stages of task graph may be separated into a plurality of distinct sub-graphs 500.1 through 500.5. Execution of the sub-graphs may then be performed by different entities and/or PXE servers 164 over the life cycle of hardware 150, taking into account each entity's unique operating environment. As an example, sub-graph 500.1 may be performed by a vendor of hardware 150, sub-graphs 500.2 and 500.3 may be performed by the purchaser of hardware 150, and sub-graphs 500.4 and 500.5 may be performed by a refurbisher of hardware 150. It should be understood that a task graph 500 may be divided into any number and arrangement of sub-graphs, as dictated by the separation of responsibilities (e.g., between PXE servers 164 and/or entities) for a particular hardware 150.

In an embodiment, data related to the performance of each sub-graph (e.g., attribute sets and/or histories acquired during performance of the stage(s) within each sub-graph) for each hardware 150 may be stored in database 114 on platform 110. This data may be uploaded to platform 110 by the PXE server 164 executing the sub-graph, during execution of the sub-graph and/or after completion of the sub-graph. Prior to execution of the next sub-graph, this data may then be downloaded by the PXE server 164 which is to execute the next sub-graph, used during execution of that next sub-graph, and then supplemented or replaced with the results generated during execution of that next sub-graph. In other words, the data collected by each PXE server 164, during execution of its respective portion of task graph 500, may be shared with the other PXE servers 164, involved in the life cycle of each hardware 150, through platform 110. In this manner, the status of each hardware 150 within its respective task graph 500 may be shared across PXE servers 164 and/or entities.

As an example, a vendor preparing to sell a particular hardware 150 may possess an internal first PXE 160 with a first PXE server 164 which implements process 400. Thus, upon receiving a PXE request from the hardware 150 for the first time (e.g., when hardware 150 first boots up in the first PXE 160), PXE server 164 generates task sub-graph 500.1 and walks the hardware 150 through the various stages of sub-graph 500.1. The first PXE server 164 uploads the results (e.g., attribute set), acquired during performance of sub-graph 500.1, to platform 110, which stores the results in database 114. For a vendor, the sub-graph (e.g., sub-graph 500.1) may comprise one or more tasks optimized for the assembly of hardware 150.

A purchaser then purchases hardware 150 from the vendor. The purchaser may possess an internal second PXE 160 with a second PXE server 164 which also implements process 400. The second PXE server 164 may download the results of sub-graph 500.1 from platform 110, and may select either sub-graph 500.2 or 500.3 based on the downloaded results of sub-graph 500.1 (e.g., selecting sub-graph 500.2 if sub-graph 500.1 ended at a first stage, and selecting sub-graph 500.3 if sub-graph 500.2 ended at a second stage). Alternatively, there may be only one option of a sub-graph (e.g., sub-graph 500.3) for a particular hardware 150. In any case, upon receiving a PXE request from the hardware 150 (e.g., when hardware 150 first boots up in the second PXE 160), the second PXE server 164 is able to match the hardware 150 to the results of sub-graph 500.1 (e.g., by matching the requester's MAC address to a MAC address in the attribute set in the results) downloaded from platform 110. The second PXE server 164 then selects, generates, or retrieves a sub-graph—assumed to be sub-graph 500.3 for purposes of illustration—for hardware 150, and walks hardware 150 through the various stages of sub-graph 500.3. The second PXE server 164 uploads the results, acquired during the performance of sub-graph 500.3, to platform 110, which stores the results in database 114. For a purchaser, the sub-graph (e.g., sub-graph 500.2 or 500.3) may comprise tasks for validating that the specification of the received hardware matches the specification of the purchased hardware, updating firmware, performing stress tests (e.g., BurnInTest™ or other load and/or reliability tests) before and/or after firmware updates, and/or the like.

At some later time, a refurbisher takes possession of hardware 150 from the purchaser. For example, the purchaser may decommission hardware 150 and sell hardware 150 to the refurbisher. The refurbisher may possess an internal third PXE 160 with a third PXE server 164 which also implements process 400. The third PXE server 164 may download the results of sub-graph 500.3 from platform 110, and may select either sub-graph 500.4 or 500.5 based on the downloaded results of sub-graph 500.3. Alternatively, there may be only one option of a sub-graph (e.g., sub-graph 500.4) for a particular hardware 150. In any case, upon receiving a PXE request from hardware 150 (e.g., when hardware 150 first boots up in the third PXE 160), the third PXE server 164 is able to match the hardware 150 to the results of sub-graph 500.3 downloaded from platform 110. The third PXE server 164 then selects, generates, or retrieves a sub-graph for hardware 150, and walks hardware 150 through the various stages of the sub-graph. The third PXE server 164 may upload the results, acquired during performance of the sub-graph, to platform 100, which may store the results in database 114. For a refurbisher, the sub-graph (e.g., sub-graph 500.4 or 500.5) may comprise tasks that are similar or identical to those performed by the purchaser.

It should be understood that any number of additional entities (e.g., future vendor, future purchaser, future refurbisher, etc.) with any number of additional internal PXEs 160 may continue to download the results from the performance of prior sub-graphs from platform 110, execute further sub-graphs, and upload the results of the performance of those further sub-graphs to platform 110 in this manner, until the very end of the hardware's life cycle. Thus, platform 110 may comprise a history of all the PXE-related tasks and the results of all the PXE-related tasks executed by each hardware 150. Various entities may access this history through platform 110 to seamlessly validate the hardware 150, determine future tasks to be executed, and/or the like. In an embodiment, this history may be accessed, in real time or near-real time, on platform 110.

In this manner, aggregated results may be reported and shared across entities. A vendor of hardware 150 is able to freeze the exact makeup of hardware 150 prior to shipment, and the purchaser is able to validate the shipment without having to change its IT infrastructure, without having to provide special authentication credentials, and without having to author any software. In addition, since, in an embodiment, the attribute set of hardware 150 is captured (e.g., in an initial stage of the task graph), the layout of hardware 150 may be shared across entities (e.g., shared with a prospective purchaser or refurbisher prior to purchase). In embodiments in which the physical locations of hardware 150, within a rack, are mapped, these locations within the rack may also be shared within the aggregated results. The aggregated results may be updated to include an updated list of IP addresses for each hardware 150, as hardware 150 moves between entities (e.g., from a vendor to a purchaser), to thereby ensure that the physical location of each hardware 150 is mapped to the correct IP address.

2.5. Improved PXE

Figure 6A:
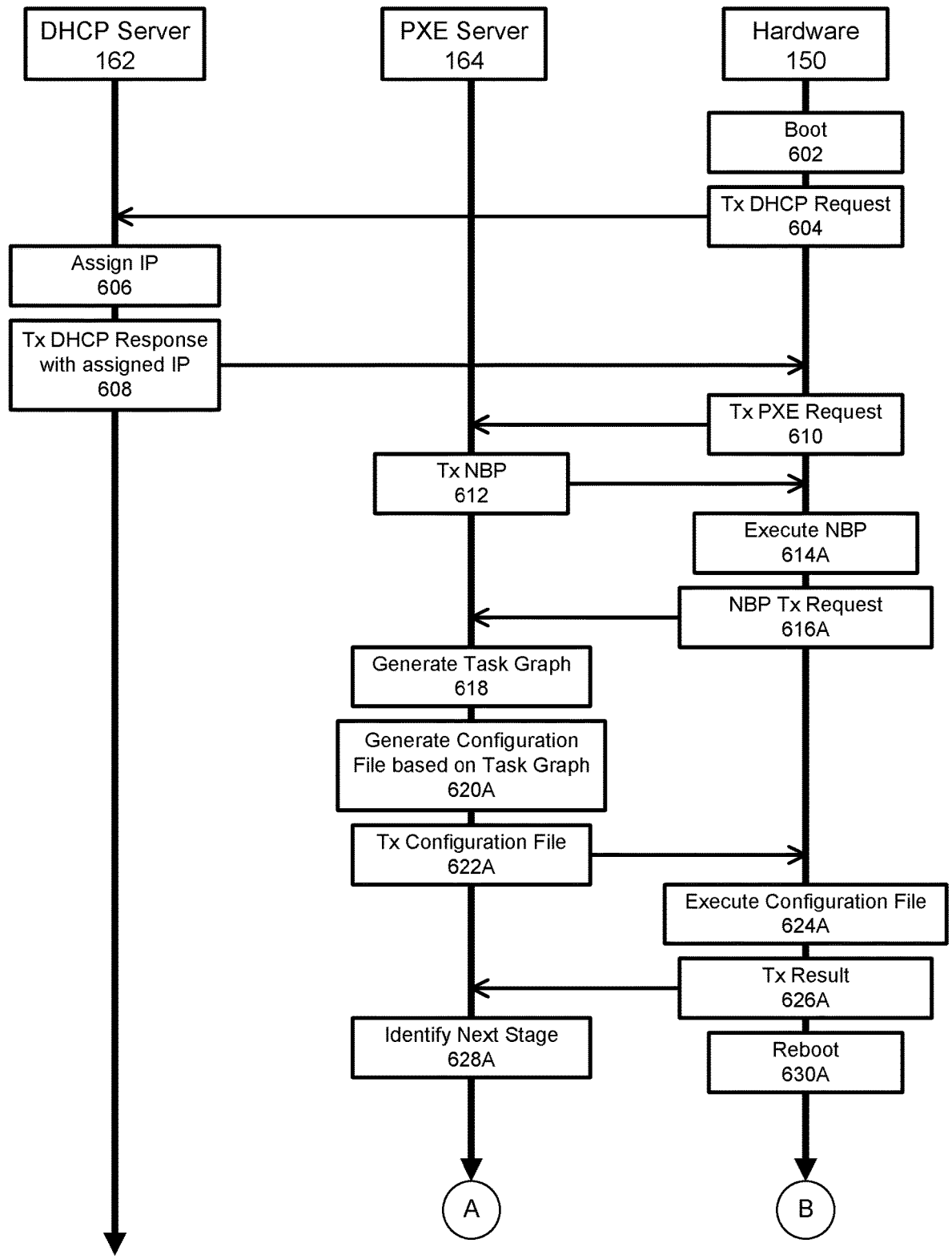
FIGS. 6A and 6B are timing diagrams that illustrate an improved PXE process, according to an embodiment.
Figure 6B:
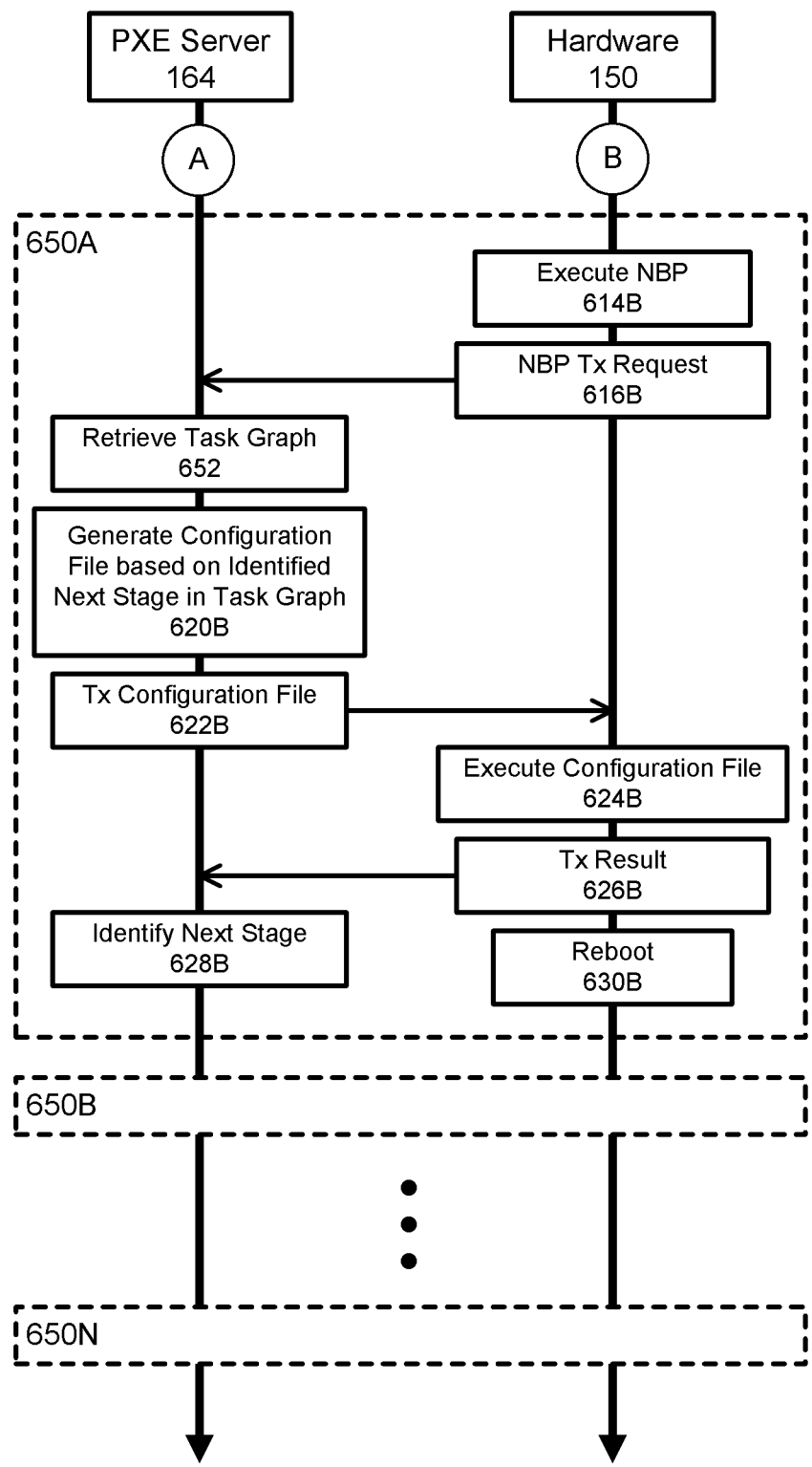

FIGS. 6A and 6B are timing diagrams that illustrate an improved PXE process, according to an embodiment. Again, while described primarily with respect to hardware 150, the same or similar PXE process may be used for station 190. It should be understood that DHCP server 162, PXE server 164, and hardware 150 are communicatively connected via one or more networks (e.g., network(s) 120B in FIG. 1C), and therefore, the various messages described with respect to FIGS. 6A and 6B may be transmitted over these network(s).

The first portion of the PXE process may remain the same as described with respect to FIG. 1A. Specifically, hardware 150 boots in step 602, and transmits a DHCP request to DHCP server 162 in step 604. In response to the DHCP request, DHCP server 162 assigns an IP address to hardware 150 in step 606, and transmits a DHCP response, including the assigned IP address and the location of PXE server 164 (e.g., the IP address of PXE server 164), to hardware 150 in step 608.

The interaction between hardware 150 and PXE server 164 is where the improved PXE process differs from the conventional PXE process described with respect to FIG. 1A. Specifically, the PXE infrastructure is programmatically augmented to enable automation that is secure and scalable and has built-in fault tolerance.

In step 610, hardware 150 transmits a PXE request to PXE server 164, at the location in the DHCP response transmitted by DHCP server 162 in step 608. In response, PXE server 164 transmits an NBP to hardware 150 in step 612.

In step 614A, hardware 150 (e.g., a processor 210 in hardware 150) executes the NBP transmitted by PXE server 164 in step 612. During execution, the NBP may transmit a request to PXE server 164 in step 616A. Step 614A may correspond to step 456 in process 450. As discussed elsewhere herein, the request may comprise an identifier of hardware 150, such as the MAC address of the NIC used to transmit the request.

By comparing the identifier in the request, transmitted by hardware 150 in step 616A, to known identifiers (e.g., within an attribute set described elsewhere herein), PXE server 164 is able to determine whether or not hardware 150 is already known to PXE server 164 (e.g., in step 404 of process 400). Assuming that hardware 150 is not already known to PXE server 164, PXE server generates a task graph (e.g., task graph 500) for hardware 150 in step 618, and stores this task graph in association with the identifier of hardware 150 in the request. Step 618 may correspond to step 406 in process 400. As discussed elsewhere herein, generation of the task graph may comprise constructing a new task graph from a set of rules or copying a predefined task graph.

In step 620A, PXE server 164 generates a configuration file based on the task graph, generated in step 618. In an embodiment, the configuration file comprises one or more instructions that implement a set of one or more tasks within a stage of the task graph. In step 622A, PXE server 164 transmits the configuration file to hardware 150. Steps 620A and 622A may correspond to step 408 in process 400.

In step 624A, hardware 150 executes the OS boot loader and kernel specified in the configuration file, transmitted by PXE server 164 in step 622A and representing a set of one or more tasks within a stage of the task graph. Step 624A may correspond to step 460 in process 450. The result of executing the configuration file in step 624A is transmitted by hardware 150 to PXE server 164 in step 626A, which may correspond to step 462 in process 450. Then, hardware 150 reboots in step 630A. Meanwhile (e.g., before or after step 630), PXE server 164 receives the result, transmitted by hardware 150 in step 626A, which may correspond to step 410 in process 400, and, based on the received result, identifies the next stage to be performed in the task graph generated for hardware 150 in step 618.

Subsequently, one or more iterations of step set 650 (e.g., iterations 650A-650N) may be performed until the PXE process is complete (e.g., a final stage of the task graph associated with hardware 150 is completed). In step set 650, steps 614B, 616B, 620B, 622B, 624B, 626B, 628B, and 630B are similar or identical to steps 614A, 616A, 620A, 622A, 624A, 626A, 628A, and 630A, respectively, and therefore, a redundant description of these steps is omitted. Step 652 corresponds to step 412 in process 400. Specifically, PXE server 164 uses the identifier in the request, transmitted by hardware 150 in step 616B, to retrieve the task graph, generated in step 618 for hardware 150.

As discussed elsewhere herein, execution of the configuration file in step 624A may comprise probing the various components (e.g., NICs, motherboard, etc.) of hardware 150. In addition, the result transmitted by hardware 150 in step 626A may comprise the result of that probe, including, for example, the MAC address of each NIC in hardware 150. PXE server 164 may store this result as an attribute set associated with the task graph generated in step 618. Thus, whenever a subsequent request is received (e.g., in step 616B in any iteration of step set 650), the task graph for hardware 150 may be retrieved, regardless of which NIC is used to transmit the request (e.g., after a reboot), since the MAC address of each potential NIC is stored in the attribute set and, therefore, associated with the task graph.

Notably, a conventional PXE server would not utilize a task graph. Rather, as discussed above with respect to FIG. 1A, a conventional PXE server would simply respond to a PXE request with a single configuration file (e.g., comprising instructions to download, mount, and invoke an operating system kernel), which would then be executed by the hardware. If the hardware were to reboot and transmit another request, the PXE server would not know that it had already sent the configuration file to the hardware, and would simply resend the same configuration file. In other words, the conventional PXE server has no way to keep track of the hardware's state, and therefore, is unable to perform a multi-stage PXE process. Furthermore, even if a conventional PXE server were modified to keep track of a MAC address for each hardware, if the hardware were to use different NICs to transmit different requests (e.g., after a reboot), the PXE server would interpret these requests as coming from different machines. Advantageously, the use of the task graph and attribute set, as described herein, solves these issues, thereby enabling PXE server 164 to implement a multi-stage PXE process.

In addition, the use of a task graph by PXE server 164 enables PXE 160 to intercept the normal boot order at a given hardware 150 at any point in the life cycle of that hardware 150. Advantageously, this facilitates the diagnosis of malfunctioning hardware, the update and evaluation of firmware, the planning and execution of rollout processes, and/or the like, in a scalable and fault-tolerant manner. For example, hardware 150 may be configured so that it always boots using PXE, and the PXE server 164 that serves hardware 150 may be configured to execute a task graph that always generates a configuration file to PXE-boot from an OS partition on the local storage of hardware 150. Then, when necessary, this task graph may be selectively overwritten with another task graph that has been specifically authored to stress test any misbehaving hardware 150.

2.6. Hardware Validation

Figure 7:
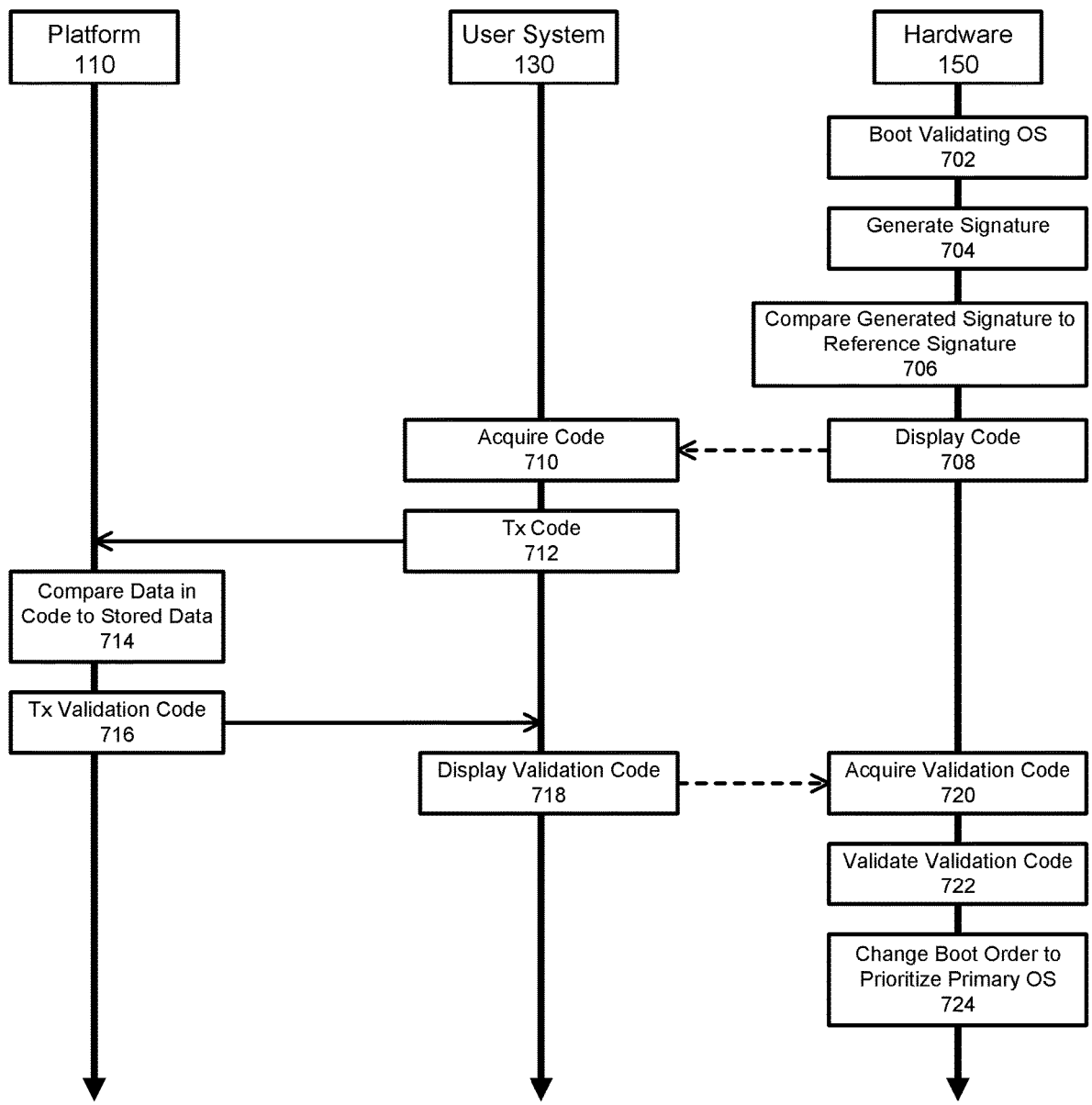
FIG. 7 is a timing diagram that illustrates a process for validating hardware, according to an embodiment.

FIG. 7 is a timing diagram that illustrates a process for validating hardware 150, according to an embodiment. As an example, hardware 150 may comprise a server or personal computer with an integrated or connected display and two operating systems installed (e.g., by the vendor). The operating systems may be installed in separate partitions or the same partition in memory (e.g., secondary memory 220) of hardware 150. The first operating system is dedicated to validating hardware 150, whereas the second operating system is a primary operating system (e.g., Windows™, Mac OS™, Linux™, etc.) to be used during normal operation of hardware 150. Initially, the boot order of the operating systems is set to prioritize the validating operating system over the primary operating system.

In step 702, hardware 150 is booted. Since the validating operating system is first in the boot order, the validating operating system is booted. The validating operating system may be used to validate the components of hardware 150 prior to allowing access to the primary operating system.

In step 704, a signature is generated for hardware 150. The generation of this signature may comprise probing the components of hardware 150 in the same or similar manner as described elsewhere herein (e.g., to acquire an attribute set that includes MAC addresses of each NIC, type and/or model of the motherboard, number of memory modules, number of prior boots, etc.). The results of the probe may then be used to generate a signature (e.g., feature vector) that represents the components and/or other attributes of hardware 150. The signature may be, but need not be, unique to each hardware 150.

In step 706, hardware 150 compares the signature, generated in step 704, to a reference signature of an attribute set stored in local persistent storage (e.g., secondary memory 220) on hardware 150 during the initial installation (e.g., by the vendor). This stored attribute set may have been previously derived in the same manner as in step 704 (e.g., by the vendor), and then digitally signed and encrypted prior to storage in the local persistent storage (e.g., by the vendor). Alternatively, the reference signature may be have been previously generated and stored in the local persistent storage (e.g., by the vendor), instead of the attribute set, in which case the reference signature does not need to be generated in step 706. Hardware 150 generates a visual code (e.g., barcode, QR code, character string, etc.) that encodes the result of the comparison in step 706 and/or other data related to hardware 150 (e.g., an attribute set, a set of mismatched attributes, etc.), and displays the visual code on its integrated or connected display in step 708.

Notably, in the shipping context (e.g., with a vendor shipping hardware 150 to a purchaser), a match between the two signatures may indicate that the configuration of the received hardware 150 is the same as the configuration of the shipped hardware 150. For example, the reference signature may encode the number or capacity of memory modules that were installed in hardware 150 prior to shipment. If one of these memory modules became detached during shipping, the generated signature, which would also encode the number or capacity of memory modules, would not match the reference signature, thereby indicating a problem. As another example, the reference signature may encode how many times hardware 150 was booted prior to shipment. Thus, if the generated signature, which would also encode the number of boots, did not match the reference signature, this would indicate that hardware 150 may have been intercepted during shipping and booted (e.g., by a malicious actor, for example, to install malicious software or hardware).

In an embodiment, the initial boot order, the installation of the plurality of operating systems (e.g., including the validating and primary operating systems), and the storage of the attribute set, to be used for the reference signature in step 706, would be performed by the execution of a task graph (e.g., the final stage of a task graph) within the PXE infrastructure of the vendor. Thus, the data, resulting from execution of this task graph, may be saved on platform 110 to be used during the process illustrated in FIG. 7.

In step 710, client application 132 on user system 130 acquires the visual code, which has been displayed by hardware 150 in step 708. Step 710 may comprise client application 132 prompting the user to capture the visual code, and the user positioning and operating an integrated camera of a mobile user system 130 so as to capture an image of the visual code on the display of hardware 150. Alternatively, step 710 could comprise a user inputting a human-readable code (e.g., character string) into mobile user system 130 (e.g., by typing characters into a text input of a GUI provided by client application 132). Regardless of how the visual code is acquired by client application 132, in step 712, client application 132 of user system 130 transmits a message, comprising the visual code or the decoded data within the visual code, over network(s) 120 to platform 110.

In step 714, after receiving the visual code or data, transmitted by user system 130 in step 712, platform 110 compares the decoded data with data stored in database 114 (e.g., uploaded data from the vendor's execution of a task graph on hardware 150), or feeds the decoded data into a function for determining whether or not validation should occur. As one example, the decoded data may comprise an attribute set of hardware 150 and/or other data related to hardware 150, which is then compared to an expected attribute set and/or other expected data previously stored in database 114. As another example, the decoded data may comprise a short string comprising encoded values of attributes that mismatch. In either case, platform 110 may determine whether or not to validate hardware 150 based on which attributes are unexpected and/or mismatched.

In step 716, platform 110 generates a validation code (e.g., based on the result of the comparison in step 714 and/or some other determination), and transmits the validation code to user system 130. The validation code may encode the result of the comparison, regardless of whether or not the comparison was successful.

In step 718, after receiving the validation code, transmitted by platform 110 in step 716, user system 130 displays the validation code (e.g., on an integrated or connected display) to the user. Then, the displayed validation code is acquired by hardware 150 in step 720. For example, the display of hardware 150 may prompt the user to input the validation code and provide an input for inputting the code (e.g., via a hardware keyboard or virtual keyboard). For ease of entry, the validation code may comprise a character string (e.g., comprising numbers and/or letters).

In step 722, hardware 150 validates the validation code, acquired in step 720. For example, step 722 may comprise hardware 150 acquiring a second validation code directly from platform 110, and comparing the validation code, acquired in step 720, with the second validation code. If the comparison results in a match, hardware 150 determines that the validation code is valid. Otherwise, if the comparison does not result in a match, hardware 150 determines that the validation code is invalid. Alternatively, hardware 150 may apply an algorithm to the validation code, acquired in step 720, to determine whether or not the validation code is valid. As another alternative, hardware 150 may compare the validation code, acquired in step 720, to a second validation code that was previously stored in hardware 150 (e.g., by the vendor) to determine whether or not they match.

Assuming that hardware 150 determines that the validation code, acquired in step 720, is valid in step 722, hardware 150 changes the boot order of the operating systems in step 724. Specifically, hardware 150 changes the boot order to prioritize the primary operating system above the validating operation system. Thus, the next time hardware 150 boots, it will boot the primary operating system, instead of the validating operating system.

Notably, until validation occurs (i.e., in step 722), the user will not have access to the primary operating system. No matter how many times a user reboots hardware 150, until validation occurs, hardware 150 will simply boot the validating operating system. Thus, advantageously, this dual boot system can be used to monitor and control access to the primary operating system by first requiring this authentication of hardware 150 via client application 132 on user system 130 and platform 110.

In an alternative embodiment to that shown in FIG. 7, if the generated signature matches the reference signature in step 706, hardware 150 may automatically boot into the next operating system (e.g., the primary operating system) and/or change the boot order, such that steps 708-722 may be omitted and user system 130 and platform 110 are not needed. However, if the generated signature does not match the reference signature in step 706, steps 708-722 could then be performed. In this case, the visual code, displayed in step 708, may encode an indication that the signatures did not match.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising, by at least one hardware processor, executing a software-defined Preboot eXecution Environment (PXE) server to:
   receive a request from a hardware device over at least one network, wherein the request comprises an identifier associated with the hardware device;
   compare the identifier to a plurality of attribute sets stored in memory;
   when the identifier does not match any of the plurality of attribute sets,
     generate a task graph for a PXE process for the hardware device, wherein the task graph comprises a plurality of stages, and wherein each of the plurality of stages comprises one or more tasks,
     store one or more external dependencies, which existed at a time the task graph was generated, in association with the task graph, and
     initiate an initial stage in the generated task graph; and,
   when the identifier matches one of the plurality of attribute sets,
     retrieve a task graph associated with the one attribute set, and
     initiate a next stage in the retrieved task graph using the one or more external dependencies that existed at the time the retrieved task graph was generated and were stored in association with the retrieved task graph.

2. The method of claim 1, wherein, when initiating both the initial stage and the next stage, the one or more external dependencies, which existed at the time the retrieved task graph was generated, are used, instead of current external dependencies.

3. The method of claim 1, wherein initiating one or both of the initial stage and the next stage comprises:
   generating a configuration file to boot from an operating system (OS) partition on local storage of the hardware device; and
   sending the configuration file to the hardware device over the at least one network.

4. The method of claim 1, wherein one or both of the initial stage and the next stage comprises downloading a software image to the hardware device.

5. The method of claim 4, wherein the software image is an operating system.

6. The method of claim 5, wherein the operating system is configured to acquire data about the hardware device and push the acquired data upstream to the PXE server.

7. The method of claim 6, wherein the operating system is configured to encrypt the data before pushing the acquired data upstream to the PXE server.

8. The method of claim 1, wherein the initial stage comprises downloading a lightweight operating system to the hardware device, wherein the lightweight operating system is configured to acquire an attribute set for the hardware device and push the acquired attribute set upstream to the PXE server.

9. The method of claim 8, further comprising executing the PXE server to:
receive the acquired attribute set from the hardware device; and
supplement the task graph based on the acquired attribute set.

10. The method of claim 1, wherein one or both of the initial stage and the next stage comprises booting the hardware device into a local operating system.

11. The method of claim 1, wherein the initial stage comprises booting the hardware device into a first operating system, and wherein the next stage comprises booting the hardware device into a second operating system that is different from the first operating system.

12. The method of claim 11, wherein the first operating system is lightweight relative to the second operating system.

13. The method of claim 12, wherein the first operating system is configured to acquire the one attribute set for the hardware device, and push the acquired one attribute set upstream to the PXE server.

14. The method of claim 1, further comprising executing the PXE server to supplement the task graph after the initial stage and before at least one of the next stage.

15. The method of claim 14, further comprising executing the PXE server to receive an updated attribute set from an operating system executing on the hardware device, wherein the task graph is supplemented based on the updated attribute set.

16. The method of claim 15, further comprising executing the PXE server to merge the updated attribute set with the one attribute set for the hardware device.

17. The method of claim 1, further comprising executing the PXE server to, after the initial stage, overwrite the task graph with a new task graph.

18. The method of claim 17, further comprising executing the PXE server to store one or more new external dependencies, which existed at a time the new task graph was generated, in association with the new task graph.

19. A system comprising:
a non-transitory computer-readable medium;
at least one hardware processor; and
software configured to, when executed by the at least one hardware processor, receive a request from a hardware device over at least one network, wherein the request comprises an identifier associated with the hardware device, compare the identifier to a plurality of attribute sets stored in memory,
when the identifier does not match any of the plurality of attribute sets, generate a task graph for a Preboot eXecution Environment (PXE) process for the hardware device, wherein the task graph comprises a plurality of stages, and
wherein each of the plurality of stages comprises one or more tasks,
store one or more external dependencies, which existed at a time the task graph was generated, in association with the task graph, and
initiate an initial stage in the generated task graph, and,
when the identifier matches one of the plurality of attribute sets,
retrieve a task graph associated with the one attribute set, and
initiate a next stage in the retrieved task graph using the one or more external dependencies that existed at the time the retrieved task graph was generated and were stored in association with the retrieved task graph.

20. A non-transitory computer-readable medium having instructions stored thereon, wherein the instructions, when executed by a processor, cause the processor to:
receive a request from a hardware device over at least one network, wherein the request comprises an identifier associated with the hardware device;
compare the identifier to a plurality of attribute sets stored in memory;
when the identifier does not match any of the plurality of attribute sets,
generate a task graph for a Preboot execution Environment (PXE) process for the hardware device, wherein the task graph comprises a plurality of stages, and wherein each of the plurality of stages comprises one or more tasks,
store one or more external dependencies, which existed at a time the task graph was generated, in association with the task graph, and
initiate an initial stage in the generated task graph; and,
when the identifier matches one of the plurality of attribute sets,
retrieve a task graph associated with the one attribute set, and
initiate a next stage in the retrieved task graph using the one or more external dependencies that existed at the time the retrieved task graph was generated and were stored in association with the retrieved task graph.

* * * * *